US011919183B2

(12) United States Patent
Schizas et al.

(10) Patent No.: US 11,919,183 B2
(45) Date of Patent: Mar. 5, 2024

(54) RAZOR CARTRIDGE

(71) Applicants: Bic Violex S.A., Anoixi (GR); Société BIC, Clichy (FR)

(72) Inventors: Charalampos Schizas, Anoixi (GR); Nikolaos Chatzigrigoriou, Anoixi (GR); Maria Petratou, Anoixi (GR); Christos Ampatis, Anoixi (GR); Dimitris Sioulas, Anoixi (GR); Maria Mitzelou, Anoixi (GR); Nikolaos Ovvadias, Anoixi (GR); Vasileios Papachristos, Anoixi (GR); George Kanakaris, Anoixi (GR); Thomas Brette, Saint Germain en Laye (FR); Alexander Nicholas Bourque, Dartmouth (CA); Nikolaos Chrysanthakopoulos, Anoixi (GR)

(73) Assignees: BIC Violex Single Member S.A., Anoixi (GR); SOCIETE BIC, Clichy (FR)

( * ) Notice: Subject to any disclaimer, the term of this patent is extended or adjusted under 35 U.S.C. 154(b) by 242 days.

(21) Appl. No.: 17/294,107

(22) PCT Filed: Nov. 29, 2019

(86) PCT No.: PCT/EP2019/083071
§ 371 (c)(1),
(2) Date: May 14, 2021

(87) PCT Pub. No.: WO2020/109543
PCT Pub. Date: Jun. 4, 2020

(65) Prior Publication Data

US 2022/0009114 A1 Jan. 13, 2022

Related U.S. Application Data

(60) Provisional application No. 62/773,747, filed on Nov. 30, 2018.

(30) Foreign Application Priority Data

Oct. 31, 2019 (EP) .................................... 19206591

(51) Int. Cl.
*B26B 21/40* (2006.01)
*B26B 21/22* (2006.01)
*B26B 21/56* (2006.01)

(52) U.S. Cl.
CPC ........ *B26B 21/4012* (2013.01); *B26B 21/227* (2013.01); *B26B 21/4087* (2013.01); *B26B 21/565* (2013.01)

(58) Field of Classification Search
None
See application file for complete search history.

(56) References Cited

U.S. PATENT DOCUMENTS

| | | | |
|---|---|---|---|
| 5,603,161 | A | 2/1997 | Welsh |
| 6,295,733 | B1 | 10/2001 | Wexler |

(Continued)

FOREIGN PATENT DOCUMENTS

| | | | |
|---|---|---|---|
| EP | 2365896 | B1 | 8/2016 |
| EP | 3357653 | A1 | 8/2018 |

(Continued)

OTHER PUBLICATIONS

International Search Report and Written Opinion in International Application No. PCT/EP2019/083071, dated Jun. 23, 2020 (18 pages).

*Primary Examiner* — Hwei-Siu C Payer
(74) *Attorney, Agent, or Firm* — Bookoff McAndrews, PLLC

(57) ABSTRACT

A cartridge for a razor comprises at least one blade and a first blade support configured to attach the at least one blade to the cartridge. The first blade support includes a first portion, a second portion, and a third portion, a first optical feature
(Continued)

provided on one or more of the first portion, the second portion, and the third portion. The first optical feature is selected from one or more of a color, a coating, a texture, a perforation, a transparency of the blade support, a light emitting source, a protrusion and a sticker.

20 Claims, 16 Drawing Sheets

(56) References Cited

U.S. PATENT DOCUMENTS

| | | | | |
|---|---|---|---|---|
| 2002/0000041 | A1 | 1/2002 | Doroodian-Shoja | |
| 2005/0268470 | A1 | 12/2005 | Skrobis et al. | |
| 2010/0077618 | A1 * | 4/2010 | Peterson | B26B 21/565 30/84 |
| 2011/0126413 | A1 | 6/2011 | Szczepanowski et al. | |
| 2014/0360021 | A1 * | 12/2014 | Sonnenberg | C09D 5/00 427/236 |
| 2018/0264669 | A1 | 9/2018 | Howell | |
| 2022/0009114 | A1 * | 1/2022 | Schizas | B26B 21/4012 |

FOREIGN PATENT DOCUMENTS

| | | | |
|---|---|---|---|
| JP | 5719755 | B2 | 5/2015 |
| WO | 2006027018 | A1 | 3/2006 |
| WO | 2012158141 | A1 | 11/2012 |
| WO | 2019020823 | A1 | 1/2019 |
| WO | WO 2019/020823 | A1 * | 1/2019 |

* cited by examiner

RAZOR CARTRIDGE

CROSS REFERENCE TO RELATED APPLICATION(S)

This application is a National Stage Application of International Application No. PCT/EP2019/083071, filed on Nov. 29, 2019, now published as WO2020109543 and which claims priority from U.S. provisional No. U.S. 62/773,747, filed on Nov. 30, 2018, the entire contents of which are incorporated herein by reference.

TECHNICAL FIELD

Aspects of the present disclosure relate generally to shaving technology, and, specifically, to a shaving system and related methods. In some embodiments, shaving cartridges of the present disclosure include one or more blade supports having one or more optical features configured to, among other things, inform a user of the intended use of a cartridge and/or when the cartridge should be replaced. A shaving razor assembly and a kit of parts are also discussed.

DESCRIPTION OF RELATED TECHNOLOGY

Shavers generally include a handle and a cartridge releasably attached to one end of the handle. The cartridge includes at least one blade for cutting hairs. A user holds the handle and repeatedly moves the blade across an area of the body to be shaved to cut the hairs in the area. Lubricating material may often be used to help hydrate and protect the user's skin during shaving. Insufficient or improper lubrication, inappropriate blade type or blade angle, dull or overused blades, and/or improper technique during shaving may result in undesirable skin irritation and/or nicks and cuts.

SUMMARY

According to an aspect, there is provided a cartridge for a razor. The cartridge comprises at least one blade, and a first blade support configured to attach the at least one blade to the cartridge. The first blade support includes a first portion, a second portion, and a third portion, a first optical feature provided on one or more of the first portion, the second portion, and the third portion. The first optical feature is selected from one or more of a color, a coating, a texture, a perforation, a transparency of the blade support, a light emitting source, a protrusion and a sticker.

According to an embodiment, the at least one blade is secured to a surface that is opposite to a skin-facing surface of the third portion of the first blade support.

According to an embodiment, the at least one blade is provided in a housing of the cartridge, partially exposed through an opening of the housing such that the first optical feature is also partially exposed through the opening.

According to an embodiment, the first optical feature is not provided on the blade.

According to an embodiment, the first optical feature is provided on at least part of the first portion, the second portion, and the third portion of the first blade support.

According to an embodiment, the at least one blade is connected to the third portion of the first blade support, and the first optical feature includes the light emitting source provided inside the blade support, the light being emitted through a transparent portion of at least the third portion of the blade support.

According to an embodiment, the first portion and the third portion are substantially straight, and the second portion is bent at an angle and connects the first portion to the third portion.

According to an embodiment, the first optical feature includes a first layer and a second layer disposed on the first layer, wherein the first layer includes a first color, the second layer includes a second color, and the second layer is configured to be gradually removed during use of the razor.

According to an embodiment, the first blade support includes a skin-facing surface and a surface opposite the skin-facing surface, wherein the at least one blade is secured to the surface opposite the skin-facing surface.

According to an embodiment, the third portion of the first blade support comprises the skin-facing surface of the blade support.

According to an embodiment, the first optical feature is a coating comprising a thermochromic ink compound.

According to an embodiment, the first optical feature is a thermochromic portion configured to change color based on a temperature of the first blade support according to a first temperature response of the thermochromic ink compound.

According to an embodiment, the thermochromic ink compound is configured to change color when the temperature of a portion of the first blade support is in the range 25-60 degrees Celsius, more specifically 30-40 degrees Celsius, and most specifically 35 degrees Celsius.

According to an embodiment, the thermochromic ink compound is configured to change color when the temperature of a portion of the first blade support is in the range 20-45 degrees Celsius, more specifically 32-42 degrees Celsius, and most specifically 35-39 degrees Celsius.

According to an embodiment, the first optical feature extends longitudinally along the blade support, and wherein the first optical feature is divided longitudinally into at least a first and a second sub-portion, wherein the first sub-portion is configured to display a different color from the second sub-portion based on the temperature of the blade support.

According to an embodiment, the thermochromic ink compound comprises one or more of: a leuco dye, a developer, and a first reaction medium.

According to an embodiment, the second sub-portion of the first optical feature comprises a further thermochromic ink compound comprising one or more of: the leuco dye, the developer, and a second reaction medium, and wherein the second reaction medium has a melting point that is higher or lower than the melting point of the first reaction medium.

According to an embodiment, the first reaction medium is selected from the group comprising -methyl palmitate, 1,2-octanediol, decanoic acid, n-octadecane, 7-pentadecanone, dimethyl sebacate, 1-dodecanol, 4-isopropylbenzyl alcohol, n-octadecane, ethyl stearate, octadecyl 3,3-diphenylpropanoate, stearyl benzoate, dodecanophenone.

According to an embodiment, the first optical feature is configured to change appearance based on a previous or current use condition of the cartridge.

According to an embodiment, the first optical feature is configured to reversibly or permanently change color based on a change of temperature of a portion of the first blade support.

According to an embodiment, the first optical feature is at least partially configured to reversibly or permanently change color when it is exposed to running water.

According to an embodiment, the first optical feature at least partially comprises a coating of poly diacetylene.

According to an embodiment, the first optical feature comprises a coating that is configured to be abraded by the skin of a user during use of the cartridge to thus display to a user that the cartridge has been used.

According to an embodiment, the first optical feature is, or comprises, a laser-marked portion.

According to an embodiment, the first optical feature comprises a combination of (i) a laser-marked portion of the blade support, and (ii) a water-soluble coating provided on top of the laser-marked portion.

According to an embodiment, the first optical feature comprises a combination of (i) a laser-marked portion of the blade support, and (ii) an abradable coating provided on top of the laser-marked portion.

According to an embodiment, the cartridge further comprises a plurality of blade supports. At least a second blade support of the plurality of blade supports further comprises a second blade attached to an inner surface of the second blade support that in use faces away from a shaving surface. The second blade support comprises a second optical feature disposed on a portion of an outer surface of the at least one blade support that in use faces towards the shaving surface.

According to an embodiment, the second optical feature comprises a second thermochromic portion configured to change color based on a temperature of the second blade support.

An effect is that the inclusion of a thermochromic portion in a plurality of blade supports enables the blade support to act as a directly visible indicator having direct thermal contact to the thermochromic portion and the razor blade. Because the thermochromic portion is in direct thermal contact with the razor blade, the thermochromic portion reports the temperature of the razor blade, or a temperature transition point of the razor blade, more accurately and/or with less time latency.

According to an embodiment, the second optical feature comprises one or more of a color, a coating, a texture, a perforation, a transparency of the blade support, a light emitting source, a sticker, and a laser-marked portion.

An effect is that the razor cartridge may contain more than one thermochromic portion (thermochromic ink) that each change color at different temperatures.

According to an embodiment, the second blade support further comprises a third optical feature disposed on a different portion of an outer surface of the second blade support that in use faces towards the shaving surface than the portion of the second blade support comprising the second thermochromic portion.

An effect is that the razor cartridge may provide feedback to the user concerning a plurality or range of water temperatures.

According to an embodiment, the third optical feature is a third thermochromic portion configured to change color based on the temperature of the second blade support according to a third temperature response of the third thermochromic portion.

An effect is that the razor cartridge may provide feedback to the user based on different colors concerning a plurality or range of water temperatures used to rinse the razor blade, and/or the temperature of the razor blade itself.

According to an embodiment, the second temperature response of the second thermochromic portion is different to the third temperature response of the third thermochromic portion.

According to an embodiment, the second thermochromic portion is configured to display a second color when the second blade support has an initial temperature and to display a further color when the second blade support has a subsequent temperature.

According to an embodiment, the second thermochromic portion is configured to change color when the temperature of a portion of the second blade support is in the range 20-45 degrees Celsius, more specifically 32-42 degrees Celsius, and most specifically 35-39 degrees Celsius.

An effect is that a razor according to the first aspect can be configured to change color when rinse water passing through a razor cartridge reaches a temperature that users prefer for pleasant wet shaving.

According to an embodiment, the second thermochromic portion extends longitudinally along the second blade support, and wherein the second thermochromic portion is divided longitudinally into at least a first and a second sub-portion, wherein the first sub-portion is configured to display a different color from the second sub-portion based on the temperature of the second blade support.

An effect is that a temperature of the razor blades of a razor cartridge can be more intuitively tracked across a range of temperatures using a range of colors.

According to an embodiment, the second thermochromic portion comprises the thermochromic ink compound comprising one or more of: the leuco dye, the developer, and the first reaction medium.

According to an embodiment, the second thermochromic portion comprises the thermochromic ink compound comprising one or more of: the leuco dye, the developer, and the second reaction medium, and wherein the second reaction medium has a melting point that is higher or lower than the melting point of the first reaction medium.

An effect is that the color transition temperature may be accurately and effectively directed towards temperatures of interest.

According to an embodiment, the first reaction medium is selected from the group comprising -methyl palmitate, 1,2-octanediol, decanoic acid, n-octadecane, 7-pentadecanone, dimethyl sebacate, 1-dodecanol, 4-isopropylbenzyl alcohol, n-octadecane, ethyl stearate, octadecyl 3,3-diphenylpropanoate, stearyl benzoate, dodecanophenone.

According to an embodiment, the second optical feature includes a first layer and a second layer disposed on the first layer, wherein the first layer includes a second color, the second layer includes a third color, and the second layer is configured to be gradually removed during use of the cartridge.

In an embodiment, the reaction medium is a wax or wax derivative.

According to an embodiment, the second blade support includes a first portion, a second portion, and a third portion, wherein the first portion is visible through a rear of the frame of the cartridge, and the second optical feature is provided on one or more of the first portion, the second portion, or the third portion.

According to a second aspect, there is provided a method for manufacturing a cartridge for a razor. The method comprises:

obtaining a blade support configured to attach a blade to a razor cartridge;

applying a first optical feature to one or more of a first portion, a second portion, and/or a third portion of the blade support, wherein the first optical feature is selected from one or more of a color, a coating, a texture, a perforation, a transparency of the blade support, a light emitting source, a protrusion and a sticker;

attaching a blade to the blade support; and securing the blade support to a cartridge for a razor.

According to an embodiment of the method, the optical feature is applied to a surface that is opposite to a skin-facing surface of the third portion of the blade support.

According to an embodiment of the method, the at least one blade is provided in a housing of the cartridge, partially exposed through an opening of the housing such that the optical feature is also partially exposed through the opening.

According to an embodiment of the method, there is further provided at least partially coating the blade support with a coating comprising the thermochromic ink compound.

According to an embodiment of the method, the thermochromic ink compound comprises one or more of: the leuco dye, the developer, and the first reaction medium.

According to an embodiment of the method, the first reaction medium is selected from the group comprising -methyl palmitate, 1,2-octanediol, decanoic acid, n-octadecane, 7-pentadecanone, dimethyl sebacate, 1-dodecanol, 4-isopropylbenzyl alcohol, n-octadecane, ethyl stearate, octadecyl 3,3-diphenylpropanoate, stearyl benzoate, dodecanophenone.

According to an embodiment of the method, there is further provided applying to at least a portion of the blade support an optical feature configured to reversibly or permanently change color when it is exposed to running water, and more specifically an optical feature at least partially comprising a coating of polydiacetylene.

According to an embodiment of the method, there is further provided laser-marking on a portion of the blade support.

According to an embodiment of the method, there is further provided:

- obtaining a plurality of blade supports, wherein a second blade support of the plurality of blade supports further comprises a blade attached to an inner surface of the blade support that faces away from the shaving surface, wherein the second blade support comprises a second optical feature disposed on a portion of an outer surface of the second blade support that faces towards a shaving surface, and
- providing the second optical feature on the second blade support as a second thermochromic portion configured to change color based on the temperature of the second blade support according to a temperature response of the second thermochromic portion.

According to a third aspect, there is provided a shaving razor assembly comprising:

- a razor handle;
- a razor cartridge according to the first aspect or its embodiments. The razor cartridge is either releasably attached to the razor handle via a pivotable or non-pivotable connection, integrally formed with the razor handle via a non-pivotable connection, or integrally formed with the razor handle via a pivotable connection.

According to a fourth aspect, there is provided a kit of parts comprising:

- a razor cartridge holder comprising a plurality of razor cartridges according to the first aspect or its embodiments, and optionally a razor handle.

Further embodiments are presented in the following detailed description and drawings, to which the reader should now refer.

BRIEF DESCRIPTION OF DRAWINGS

The accompanying drawings, which are incorporated in and constitute a part of this disclosure, illustrate various exemplary embodiments and together with the description, serve to explain the principles of the disclosure.

Aspects of the disclosure may be implemented in connection with embodiments illustrated in the attached drawings. These drawings show different aspects of the present disclosure and, where appropriate, reference numerals illustrating like structures, components, materials, and/or elements in different figures are labelled similarly. It is understood that various combinations of the structures, components, and/or elements, other than those specifically shown, are contemplated and are within the scope of the present disclosure. There are many aspects and embodiments described herein. Those of ordinary skill in the art will readily recognize that the features of a particular aspect or embodiment may be used in conjunction with the features of any or all of the other aspects or embodiments described in this disclosure.

DETAILED DESCRIPTION

Both the foregoing general description and the following detailed description are exemplary and explanatory only and are not restrictive of the features, as claimed. As used herein, the terms "comprises," "comprising," or other variations thereof, are intended to cover a non-exclusive inclusion such that a process, method, article, or apparatus that comprises a list of elements does not include only those elements but may include other elements not expressly listed or inherent to such a process, method, article, or apparatus. Additionally, the term "exemplary" is used herein in the sense of "example," rather than "ideal." It should be noted that all numeric values disclosed or claimed herein (including all disclosed values, limits, and ranges) may have a variation of +/−10% (unless a different variation is specified) from the disclosed numeric value. Moreover, in the claims, values, limits, and/or ranges mean the value, limit, and/or range +/−10%.

Reference will now be made in detail to the exemplary aspects of the present disclosure described below and illustrated in the accompanying drawings. Wherever possible, the same reference numbers will be used throughout the drawings to refer to same or like parts.

Additional objects and advantages of the disclosed aspects will be set forth in part in the description that follows, and in part will be readily apparent from the description or may be learned by practice of the embodiments. It is to be understood that both the foregoing general description and the following detailed description are exemplary and explanatory only and are not restrictive of the claims.

Embodiments of the present disclosure may promote better shaving habits by creating a more efficient and enjoyable shaving session for a multitude of users by informing a user of the intended use of a cartridge, such as whether a cartridge is designed for a particular user and/or a specific body area for which the cartridge is designed, and/or advising a user when to replace a cartridge.

Figure 1:
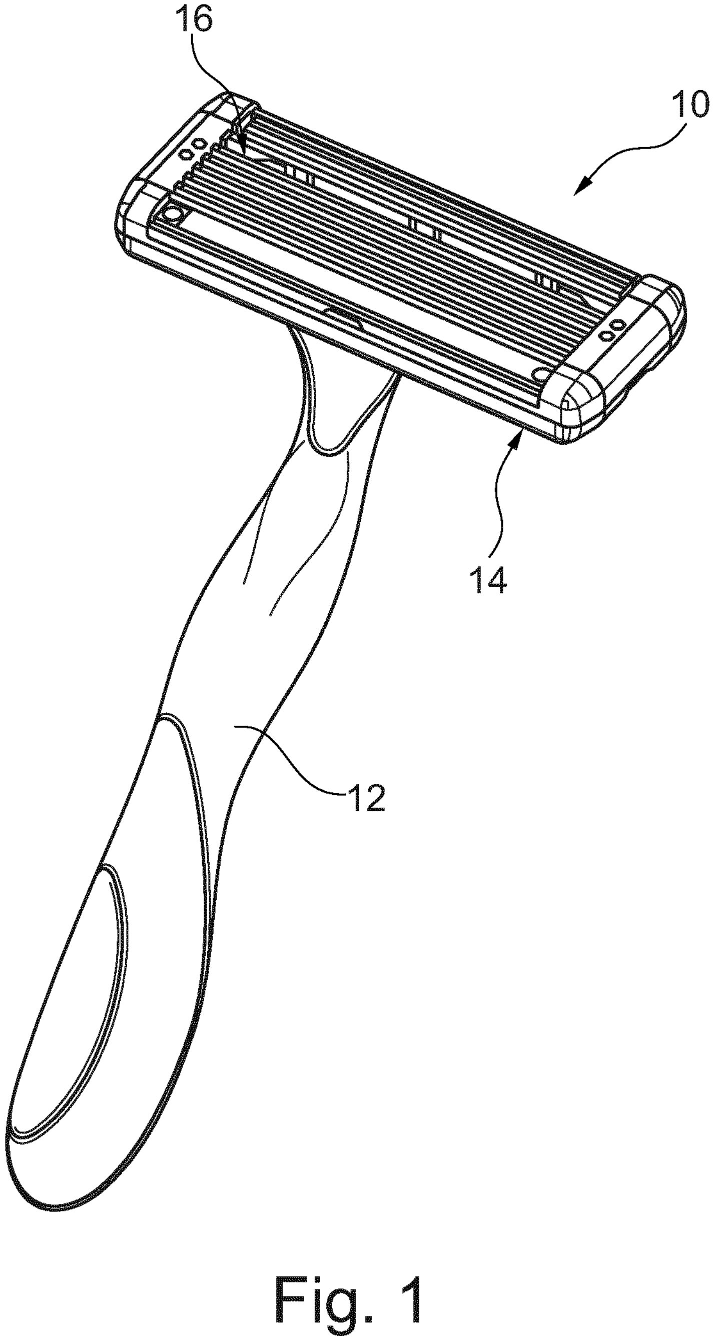
FIG. 1 depicts an exemplary shaver, according to aspects of the present disclosure.

An exemplary shaver 10 is shown in FIG. 1. Shaver 10 may include a handle 12 and a cartridge 14 releasably attached thereto. Cartridge 14 may include one or more blades 16, and each blade 16 may be fixed to a blade support 18, as shown in FIG. 2.

Figure 2:
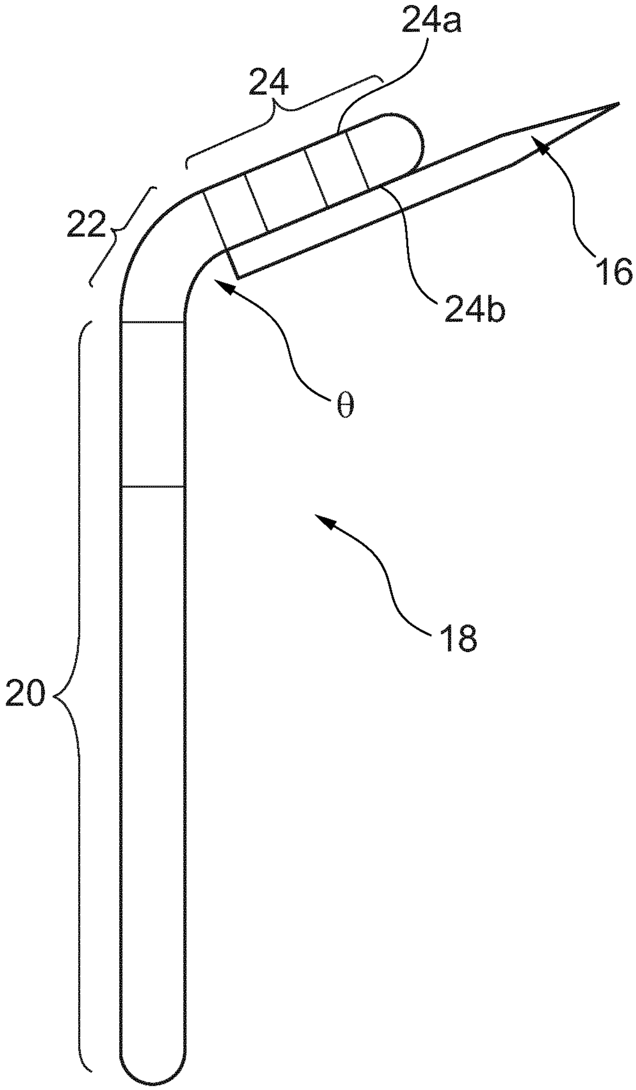
FIG. 2 depicts a side view of an exemplary blade support supporting a blade, according to aspects of the present disclosure.

Referring to FIG. 2, blade support 18 may include a first (or lower) portion 20, which may be substantially straight, a second (or intermediate or bent) portion 22, which may be bent at an angle θ, and a third (or upper) portion 24, which may also be substantially straight. The angle of second portion 22 may be any angle between approximately 0 and approximately 180 degrees, or approximately 45 to approximately 135 degrees, or approximately 90 to approximately 120 degrees. As a result, third portion 24 may extend at an angle θ of approximately 120 degrees to approximately 160 degrees relative to first portion 20. In a particular example, the angle of second portion may be of 68 degrees.

Third portion 24 may include a skin-facing surface 24*a*. According to an exemplary embodiment, blade 16 may be attached to third portion 24 of blade support 18 in a plane parallel to a longitudinal axis of third portion 24. More specifically, as shown in FIG. 2, blade 16 may be secured to a surface 24*b* that is opposite skin-facing surface 24*a* of third portion 24. In an exemplary embodiment, before a first use of cartridge 14, blade 16 extends further than third portion 24 of blade support 18, such that blade support 18 either does not contact or minimally contacts the user's skin during the first use. Blade support 18 may be made of a resin, metal, and/or other material now-known or later-developed in the art. Alternatively, different parts of blade support 18 may be made of different materials. Further, one or more of first portion 18, second portion 20, and third portion 22 may be flexible to move when placed in contact with a user's skin. Alternatively or additionally, blade 16 may be secured to skin-facing surface 24*a* of third portion 24 such that at least a portion of skin-facing surface 24*a* remains exposed to a user.

Figure 11:
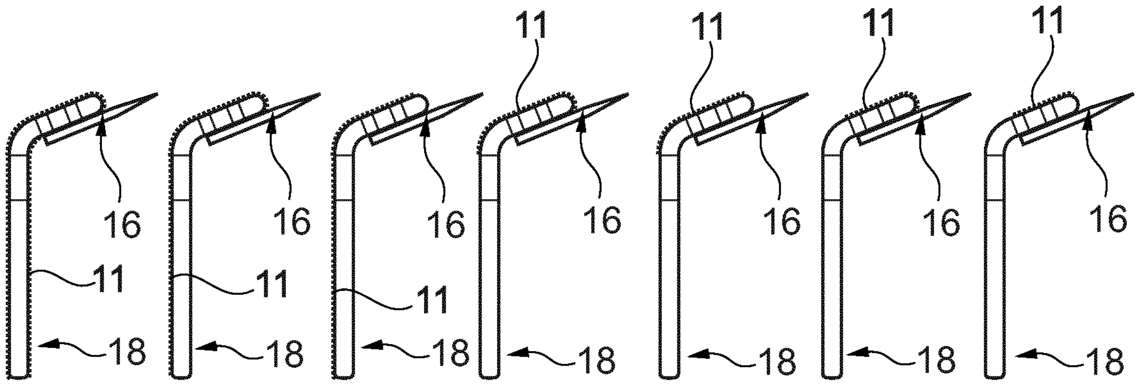
FIG. 11 depicts side views of a plurality of blade supports illustrating various locations of an exemplary optical feature, according to aspects of the present disclosure.

Referring to FIG. 11, blade support 18 may have various optical features 11, including, but not limited to, colors, textures, stickers, perforations, letters, logos and/or shapes, which may provide identification characteristics and/or information relating to cartridge 14 or blades 16 thereof. While cartridge 14 may include a plurality of blade supports 18, reference will be made to a singular blade support 18 and a single blade 16 for ease of understanding, unless stated otherwise. It will be understood that one or more optical features 11 applied to blade support 18 may be applied to all or some of blade supports 18 within a cartridge 14. These various features 11 may help to inform a user if, among other things, a particular cartridge is suitable for a desired shave. For example, since blades 16 on various cartridges 14 may have different characteristics, e.g., blade shape or angle, depending on the type of hair to be cut during a shave, identifying features of blade supports 18 may inform a user that a particular cartridge is best suited for a certain skin type or for shaving a particular part of the body. Further, according to some embodiments, optical feature 11 is not provided on blades 16. Additionally or alternatively, optical feature 11 may be provided on at least a portion of at least one of blades 16.

According to an embodiment, one or more blade supports 18 may be partially or completely covered with one or more optical features 11, such as, e.g., texture, a colored coating/paint, visually distinctive adhesives, geometric configurations, and/or perforations.

Figure 3:
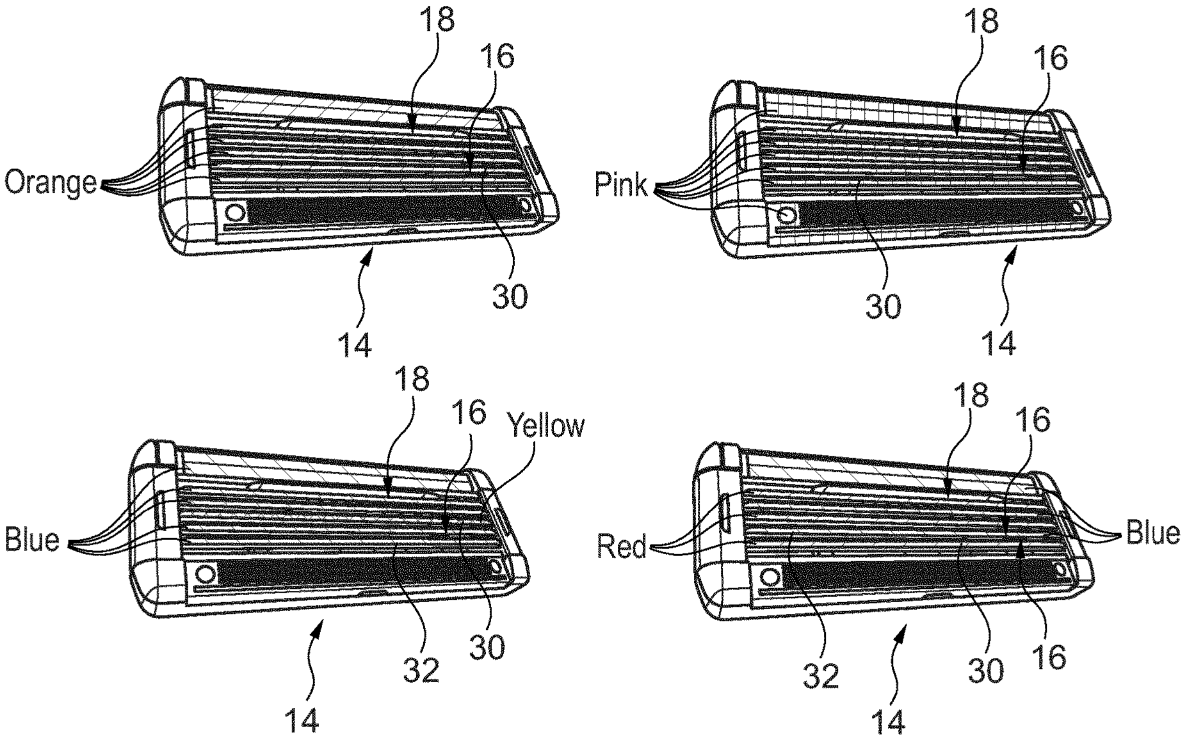
FIG. 3 depicts perspective views of a plurality of cartridges for use with an exemplary shaver.

With specific reference to FIG. 3, for example, one or more blade supports 18 may be partially or completely covered with one or more colored paints or coatings. For example, one or more blade supports 18 may be provided with one, two, three, or more visually different colored paints or coatings. In some embodiments, it is contemplated that a layer of a first colored paint or coating is provided on a first portion of a blade 18 support, and a layer of a second, different colored paint or coating is provided on a second portion of the blade support 18, with the second portion being adjacent to or spaced apart from the first portion.

In addition, or alternatively, a single portion (or an entirety) of blade support 18 may be provided with multiple layers of colored paints/coatings. Stated differently, a single blade support 18 may include a first layer 30 of a first colored paint disposed on and in contact with a surface (e.g., surface 24*a*) of blade support 18.

Moreover, in some embodiments, a second layer 32 of a second, differently colored paint may be disposed on or over the layer 30 of the first colored paint. In some embodiments, it is contemplated that the second layer 32 of the second colored paint may at least partially (or completely) cover the layer 30 of the first colored paint, thereby obscuring the first colored paint from a user's view.

The second layer 32 of the second colored paint may be configured to dissolve, disintegrate, or otherwise be removed during use of cartridge 14. For example, it is contemplated that each time cartridge 14 is exposed to water, shaving aids, body temperatures, or a user's skin, e.g., during a shave session, a portion (e.g., a thickness) of the second layer 32 of second colored paint may be removed from the top of the first layer 30 of the first colored paint. Thus, as the second layer 32 of second colored paint wears out (e.g., due to use), the first layer 30 of the first colored paint may be revealed to a user.

In some embodiments, the first layer 30 of the first colored paint may also be configured to be to dissolve, disintegrate, or otherwise be removed during use of cartridge 14. However, those of ordinary skill in the art will recognize that the second layer 32 of second colored paint may be configured to dissolve, disintegrate, or otherwise be removed at rate that is faster than the rate of removal of the first layer 30 of the first colored paint.

Thus, in the embodiment of FIG. 3, a user may obtain a new cartridge 14 having blade supports 18 that are colored, e.g., orange. After a predetermined number of shaving sessions or strokes, the layer of orange colored paint may be removed, thereby revealing a surface of the blade support 18, or, if provided, another color, e.g., white. This change in color (e.g., removal of the orange color from blade supports 18) may communicate any suitable information to a user, including, but not limited to, that the cartridge is at the end or nearing the end of its useful life. As a result, the coloring(s) on blade support 18 may be configured to function as a type of blade dullness indicator. That is to say, the amount of second layer 32 remaining on top of first layer 30 may correspond to the sharpness of the blades 16 within cartridge 18.

In some embodiments, it is contemplated that a rate of removal of second layer 32 may increase (e.g., exponentially or linearly) as the sharpness of blades 16 decreases. That is, those of ordinary skill in the art will readily recognize that contact between blade supports 18 and a user's skin may increase as the blades 16 dull, thereby increasing the amount of friction applied to blade supports 18, which, in turn, may lead to an increase in the rate of removal of the second layer 32 of the second colored paint.

Though the embodiment of FIG. 3 is described in connection with two layers of differently colored paints/coatings, those of ordinary skill in the art will readily recognize that the principles of the present disclosure contemplate any suitable number of layers of differently colored paints/coatings. Moreover, first layer 30 and second layer 32 may include any suitable thicknesses. In some embodiments, a thickness of second layer 32 may be the same as or different from a thickness of first layer 30.

As alluded to above, some embodiments of the present disclosure contemplated that one or more blade supports 18 may be partially coated by a first layer 30 of first colored paint. Subsequently, a second layer 30 of second colored paint may be applied over first layer 30 and onto the portions of blade support 18 not coated by first layer 30. Collectively, the various portions of first layer 30 may form a pattern, text, or another graphic configured to communicate information to a user. Thus, as second layer 32 wears off, a distinct pattern of first layer 30 and second layer 32 may be formed. For example, this pattern could spell a phrase or other identifying mark that indicates cartridge 14 should be replaced.

For example, second layer 32 could be a blue color and, when second layer 32 wears off, first layer 30 could be exposed to show a yellow or orange color. Alternatively or additionally, a single color could be applied as first layer 30, such as orange or pink, with or without a subsequent second layer 32 applied thereto.

Figure 4:
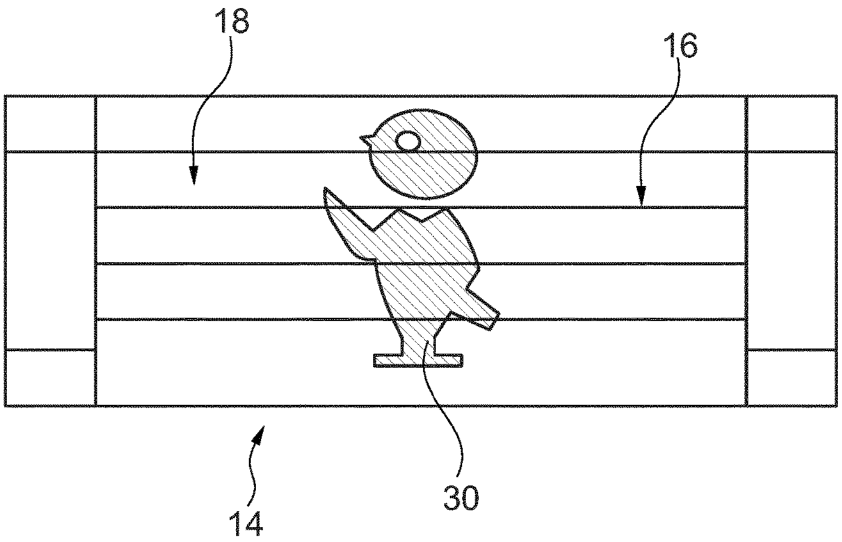
FIG. 4 depicts a top view of an exemplary cartridge, wherein blade supports of the cartridge include one or more optical features perceivable by an unaided eye of the user, according to aspects of the present disclosure.

Alternatively or additionally, a pattern or image may be applied as first layer 30 to blade support 18. For example, the pattern may be a symbol representative of a brand or other marketing device, as illustrated in FIG. 4. Thus, when second layer 32 wears off, the user may observe the marketing icon and may be prompted or otherwise reminded to purchase a certain brand of cartridges.

As described above, optical features 11 are generally not applied to blade 16. However, in some embodiments, a portion of blade 16 may contain optical features 11 to provide continuity of an image, such as, but not limited to, a brand or marketing image.

Figure 5:
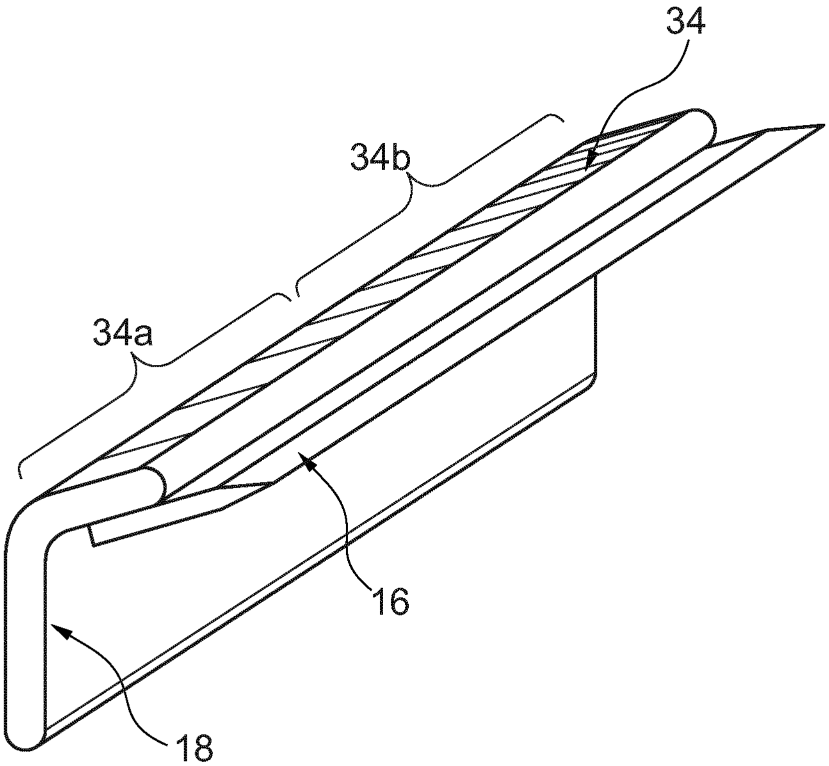
FIG. 5 depicts a perspective view of a blade support providing an optical feature, according to aspects of the present disclosure.

One or more portions of blade support 18 may additionally or alternatively be coated with a thermochromic dye 34, as shown in FIG. 5. As those of ordinary skill in the art will recognize, thermochromic dye 34 may be configured to change color or provide another perceivable characteristic upon exposure to different temperatures. In the present example, thermochromic dye 34 may be configured to inform a user about a temperature of the water being used for shaving. For example, thermochromic dye 34 may change color when the water is within a satisfactory temperature range for shaving, as shown by the varying colors of thermochromic dye 34 on blade support 18, e.g., a red color 34*a* indicating water is sufficiently warm and a blue 34*b* color indicating the water is not sufficiently warm for shaving.

According to exemplary embodiments, a satisfactory water temperature for shaving is approximately 25-60° C., or approximately 30-40° C. or about 35° C. When the water temperature is within this range, thermochromic dye 34 on blade support 18 may change from a first color (e.g., red 34*a*) indicating unsatisfactory shaving conditions to a second color (e.g., blue 34*b*), indicating the satisfactory shaving condition.

In some embodiments, the thermochromic dye 34 is not an exclusive element, but may be combined with first layer 30 and second layer 32 to provide multiple characteristics of shaver 10 to the user. For example, thermochromic dye 34 may be applied along an outer edge of blade support 18, while a pattern formed by first layer 30 and second layer 32 may be provided within a border formed by thermochromic dye 34. In this manner, a user may be informed both of a satisfactory shaving condition while also understanding when cartridge 14 should be replaced. It will also be understood that the specific patterns are not limited thereto.

According to another embodiment, thermochromic dye 34 may be replaced with and/or combined with a coating of a material that indicates information about the skin of the user, such as, but not limited to, a skin's pH level. This information may further aid the user in having an optimal shave by, e.g., conditioning the skin via application of various shaving agents.

Figure 6:
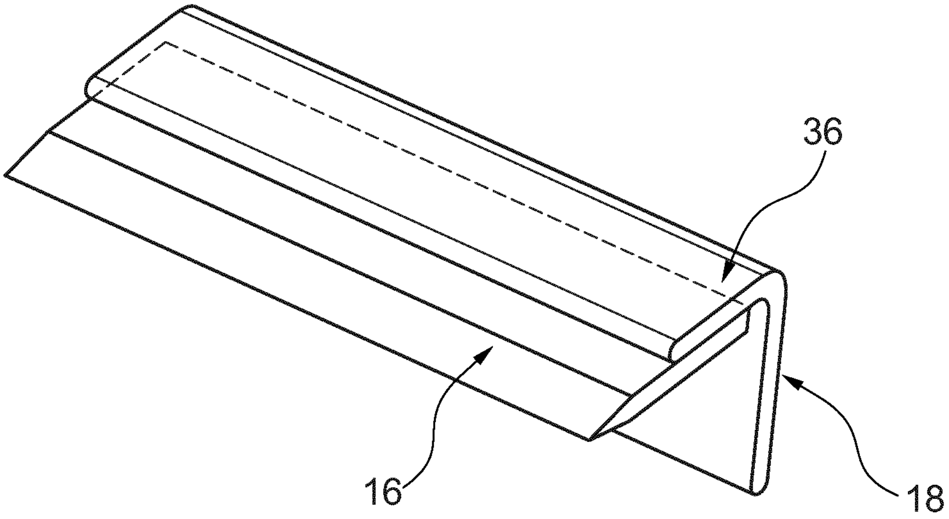
FIG. 6 depicts a perspective view of a blade support providing another optical feature, according to aspects of the present disclosure.

Referring now to FIG. 6, blade support 18 may include one or more translucent portions 36. Blade support 18 may further include a light emission source (not shown), such as a light emitting diode (LED), provided therein or otherwise disposed within cartridge 15. When activated, the LED may illuminate translucent portion 36 of blade support 18. Thus, a user may be able to use shaver 10 in no or lower light conditions. Moreover, in some embodiments, one or more of cartridge 14, blades 16, and/or blade support 18 may include a fluorescent coating configured to enhance the visibility thereof in lower light environments.

The LED may emit any color, such as for marketing purposes. For example, the color may be a color associated with a particular brand of cartridges 14. Additionally or alternatively, the LED may emit one or more colors associated with a holiday season or a country within which the cartridge is sold. It will be understood that the color(s) of the LED are not limited. Further, the light emission source may be configured to emit a light with germicidal characteristics, such as, e.g., short-wavelength ultraviolet light (i.e., UV-C light). It will be understood that any germicidal or light emission source may be used with blade support 18. It will also be understood that translucent portion 36 may be semi-translucent and/or may not extend around the entirety of blade support 18. Further, translucent portion 36 may be combined with other identifying characteristics of a cartridge described herein, such as, for example, first layer 30 and second layer 32 and/or thermochromic dye 34.

Figure 7:
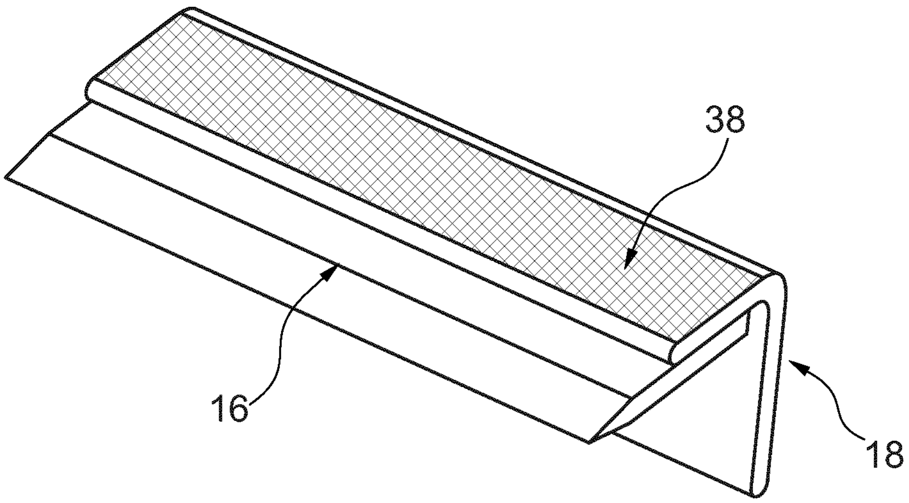
FIG. 7 depicts a perspective view of a blade support providing yet another optical feature, according to aspects of the present disclosure.

According to another embodiment, blade support 18 (e.g., surface 24*a*) may include a textured surface 38, as shown in FIG. 7. Textured surface 38 may provide skin treatment during shaving, such as exfoliation, hydrophobic, low friction and/or massage of the tissue. For example, textured surface 38 may be a pattern engraved into blade support 18, whereby the pattern promotes exfoliation and/or massages the tissue. The pattern may serve additional purposes, such as indicating a particular cartridge brand for marketing.

It will be understood that textured surface 38 is not limited to engraving but may be formed using any method known in the art, such as, but not limited to, die molding. Textured surface 38 may also be formed separately as a sheet with a pattern formed thereon and the sheet may be applied to the desired areas of blade support 18 via, e.g., an adhesive. As described above, textured surface 38 may be combined with other identifying characteristics of a cartridge described herein, such as, for example, first layer 30 and second layer 32, thermochromic dye 34, and/or translucent portion 36. Moreover, in some instances, textured surface 38 may include one or more lotions, lubrication, and/or therapeutic agents configured to, e.g., aid a shaving session. For example, textured surface 38 may be impregnated with one or more lubricating beads (not shown) configured to elute lubrication when passed over a user's skin.

Figure 8:
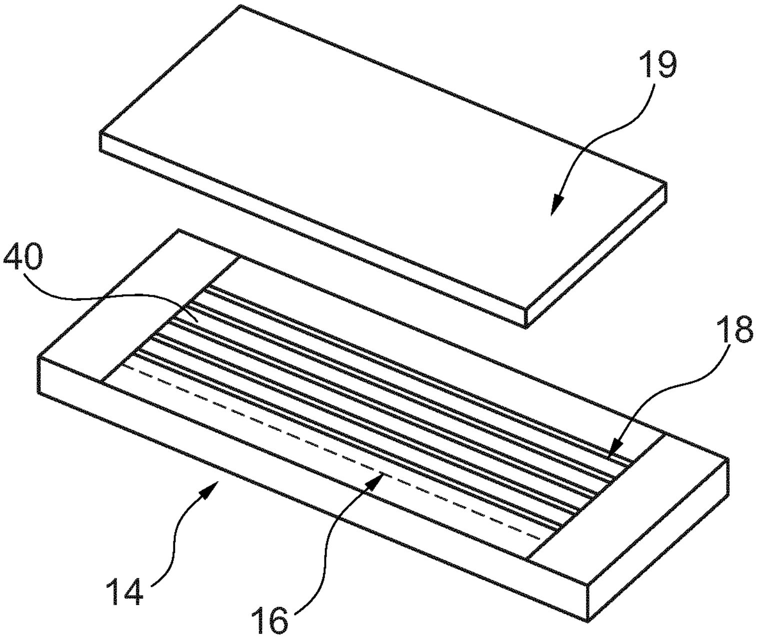
FIG. 8 depicts a perspective view of a cartridge providing an optical feature and/or an attachment system for a blade cover, according to aspects of the present disclosure.

Turning now to the embodiment of FIG. 8, a cartridge 14 is depicted, configured to cooperate with a blade protector 19. Specifically, one or more blade supports 18 may be made magnetic via the inclusion of a magnetic coating 40 or a magnetic core (not shown) encapsulated by resin or plastic. Further, a blade protector 19 also may include magnetic properties via, e.g., a magnetic coating, a magnetic core, and/or one or more magnetic materials being impregnated within blade protector 19.

For example, blade protector 19 may be made of steel or a filled plastic fully or partially coated/provided with magnetic particles. As a result, therefore, blade protector 19 may be configured to be removably secured to cartridge 14 in a designated docking area position configured to, e.g., shield blades 16 from a user.

Additionally or alternatively, the magnetic characteristics of cartridge 14 and/or blade protector 19 may be used to retain cartridge 14 and/or shaver 10 on, e.g., a razor holder (not shown). The razor holder may be fixedly secured on, e.g., a wall of a bathroom, and may be configured to retain shaver 10 in a convenient location.

Figure 9:
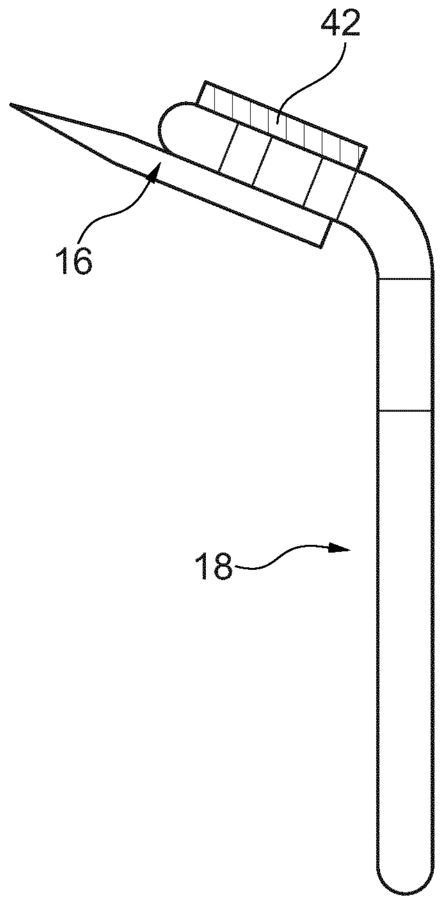
FIG. 9 depicts a side view of a blade support providing an optical feature with skin-protecting characteristics, according to aspects of the present disclosure.

Referring to FIG. 9, blade support 18 may include a colored rubber or gel-like coating 42 configured to, e.g., stretch a user's skin during a shaving stroke. Coating 42 may aid in reducing certain discomforts associated with shaving, such as, but not limited to, reducing skin bumps. Coating 42 may include first layer 30 and second layer 32 applied thereon in a specific pattern, e.g., ruffles to facilitate rinsability and skin management. As described above, during shaving, second layer 32 may rub off through friction to provide the user with a pattern to indicate, for example, to replace cartridge 14. Portions of coating 42 may also be thermochromic or be coated with thermochromic dye 34 to indicate to the user that the water temperature is sufficient for shaving.

Alternatively or additionally, portions of coating 42 may be partially or fully translucent to allow light to permeate therethrough. This allows a LED or other light emitting source associated with blade support 18 to pass through translucent portion 36 and coating 42. Further, coating 42 may include a textured surface 38 to massage and/or exfoliate a user's skin.

It will be understood that any of the coatings, colors, and/or textures described herein may be provided integrally with blade support 18 or may be applied to a surface of blade support 18 as a paint, a sticker, or by any other method known in the art. Further, while colors, coatings, and other characteristics associated with blade support 18 may be indicative of a suitable use cartridge 14, these characteristics are in no way intended to limit the use of cartridge 14.

For example, colors or patterns associated with blade support 18 may indicate that a particular cartridge is better suited for use by a particular sex (e.g., a blue color may indicate that the cartridge is for use by men, and a pink color may indicate that a cartridge is for use by women), on a particular body area (e.g., a circular patter may indicate that a cartridge is for use on a face, and a pattern of lines may indicate that a cartridge is for use on a leg), and/or on a particular skin sensitivity type (e.g., a red color may indicate that a cartridge includes blades configured for a close shave, and a yellow color may indicate that a cartridge includes blades configured for sensitive skin).

These characteristics are merely intended to inform a user that blades 16 may be formed of a particular material and/or angled in a specific manner that is more suitable for one use than another. Yet, a user is not limited by these characteristics and may use any cartridge 14 suitable for use with shaver 10.

According to another embodiment, colors and/or patterns associated with blade support 18, and more generally cartridges 14, may indicate a specific manufacturing process and/or characteristics of cartridge 14, thereby improving quality controls and logistics by making it easier to review the quality of cartridge 14 or deploy cartridge 14 in stores.

Specifically, various color combinations may be deployed to facilitate that matching of blade support and blade subassemblies in the manufacturing of cartridges. As a result, traceability and quality controls may be enhanced due to the visual impact of the blade/blade support subassembly required for a particular product line.

Colors and/or patterns associated with cartridge 14 may assist a user prior to using cartridge 14 with shaver 10. For example, users may identify a brand or specific cartridge 14 by colors and/or patterns associated with that cartridge 14, making it easier for a user to purchase cartridge 14, which may lead to increased sales thereof.

Figure 10A:
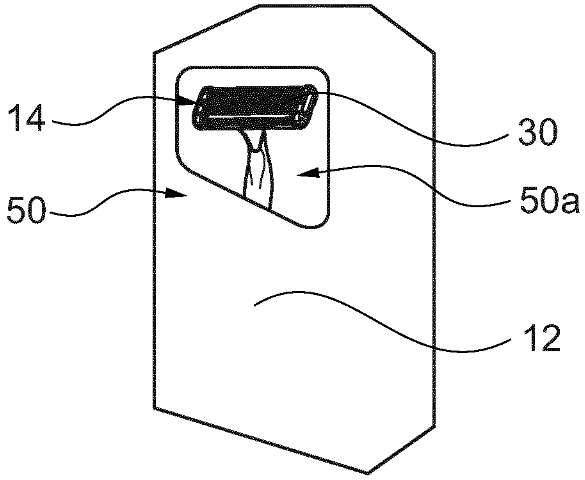
FIG. 10A depicts a perspective view of a packaging for a shaver with identifying characteristics, according to aspects of the present disclosure.
Figure 10B:
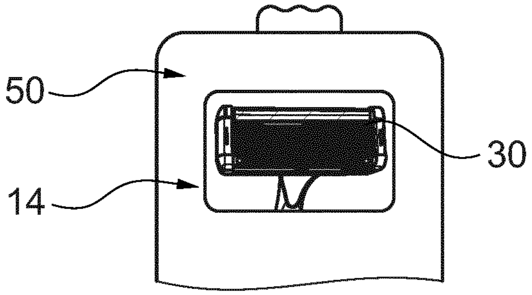
FIG. 10B depicts a front view of a packaging of a shaver with identifying characteristics, according to aspects of the present disclosure.

For example, as shown in FIGS. 10A and 10B, cartridge 14, with or without a handle 12 attached thereto, may be provided in a packaging 50 having a transparent window 50*a*. Optical features 11, such as first layer 30, may enable a user to easily identify the desired cartridge 14 to be purchased.

Additionally or alternatively, blade support 18 may include one or more coatings to enhance properties of cartridge 14 and/or blades 16. For example, blade support 18 may include a hydrophobic coating, such as Teflon™, which may enhance rinsability, anticorrosion, and/or fluidity properties of cartridge 14 as well as potentially reducing friction during use of cartridge 14.

Blade support 18 may also include micro-nano structured support or coatings, such as laser structuring or imprint lithography, to enhance hydrophobic, antifriction, and/or visual properties of cartridge 14.

It will be understood that any of the coatings, colors, or materials associated with blade support 18 may be anti-microbial/anti-bacterial. Additionally or alternatively, optical features 11 described herein could be combined with shaving aids. For example, optical features 11 may be or may include a coating that is absorbent to water and lubricate the user's skin during a shave.

It will also be understood that optical features 11 may be provided along any of first portion 20, second portion 22, and/or third portion 24, as shown in FIG. 11, depending on the desired effect of optical features 11 and/or the characteristics of optical features 11 (e.g., second layer 32 may only be provided at third portion 24, where the skin contacts blade support 18, since second layer 32 may be intended to be removed by friction during use.)

Moreover, blade support 18 may be made using a plastic, a glass, a metal, and/or a composite material with or without additional materials (e.g., reinforced with fibers) impregnated therein. It is understood that the material will be selected based on, e.g., the desired effect of optical feature 11, transparency of the material, usability, availability and/or cost, rinsability, and/or durability. The material may also provide additional functionality to blade support 18, such as a flexibility which may provide a more comfortable shave.

It will be further understood that blade support 18 may be formed in different manners. For example, blade support 18 may first be formed in the desired shape and optical features 11 applied thereto. Alternatively, blade support 18 may have optical features 11 applied thereto prior to forming the desired shape of blade support 18. In some embodiments, blade supports 18 and/or optical features may be formed by a precision stamping process or "coining."

In an embodiment, the blade support 18 may also include micro-nano structured support or coatings, such as laser structuring or imprint lithography, to enhance hydrophilic, properties of cartridge 14.

In an embodiment, textured surface 38 is formed using lithography or surface structuring.

In an embodiment, the blade support 18 may have various optical features 11 comprising one or more protrusions.

Protrusions may be any type of 3D configurations that may be positioned on the outer surface of the blade support and extend from the surface of the blade support. In embodiments, the protrusions may extend from the surface of the blade support according to an axis being substantially perpendicular to a plane crossing tangentially the outer surface of the blade support.

In embodiments, the protrusions may be solid objects that may be applied for example as printed objects via printing methods on the outer surface of the blade support. The deposition of solid objects on the outer surface of the blade support allows the solid objects to act not only as optical features, but also for example to minimize blade drag on the skin and increase glideness during shaving. In embodiments, the protrusions may provide several design visual elements, because one or more of the protrusions may have similar size, variant sizes, any shape and the protrusions may also comprise a letter or logo or other graphic elements.

In embodiments, the protrusions may be active elements that erode during use. That way, the protrusions provide a visual signal to the user about the status of the razor head, while improving shaving process by contributing lubrication and/or glideness. In embodiments, the protrusions may act as wear indicators and glide elements by bearing an external coating that erodes during shaving due to abrasion occurred in recurring shaving strokes. Thus, when the coating of the protrusion is removed, the user is notified that the cartridge may need to be replaced. In some embodiments, the protrusions may act as wear indicators and lubricating elements by being made of lubricating compositions comprising water-soluble and/or water-insoluble components, and/or their combination, and/or soap and soap-based mixtures.

Example compositions for protrusions acting as lubricating elements are known for example from WO2019/020823. In embodiments, the protrusions may act as optical elements but also as additional contact points of the skin with the top surface of the cartridge. That way, the protrusions contribute to a smoother shaving process, since the skin bulge is reduced and the blade edges contact the skin with less aggressiveness.

In an embodiment, blade support 18 may include a first (or lower) portion 20, which may be substantially straight, a second (or intermediate or bent) portion 22, which may be curved or bent at an angle θ. Such blades are also known as "bent blades".

A further example of a razor cartridge according to the first aspect will now be discussed, providing a specific example of the implementation of an optical feature provided by a thermochromic ink compound.

Razor cartridges (also known as safety razor cartridges or shaver cartridges) are permanently or removably attached to a razor handle that, in use, is oriented in the shaving direction. Razor cartridges typically comprise one or more cutting members, each supporting a blade, mounted perpendicular to the shaving direction. Razor cartridges are also typically provided with a guard (at a leading longitudinal side of the razor cartridge in the shaving direction) and a cap (at a trailing longitudinal side of the razor cartridge in the shaving direction). In use, a user holds the razor handle in the shaving direction and brings the razor cartridge into contact with a portion of skin defining a shaving surface.

Typically, a shaving plane is defined by a tangential line intersecting the first and second skin contact points of, for example, cutting edges of the shaving head. More simply, the shaving plane may be approximated as a plane intersecting a plurality of lines between the highest points on the skin-contacting surface of a razor cartridge—for example, the flat plane between the top of a guard and the top of a cap of the shaving head. Movement of the razor handle causes the blades of the razor cartridge to be moved across a shaving surface (skin) of a user in the shaving direction, such that the shaving plane is translated across the shaving surface in the shaving direction, enabling the blades to remove unwanted hair. The temperature of the water used to rinse the razor cartridge can affect the comfort of the user and the shaving performance.

Figure 12:
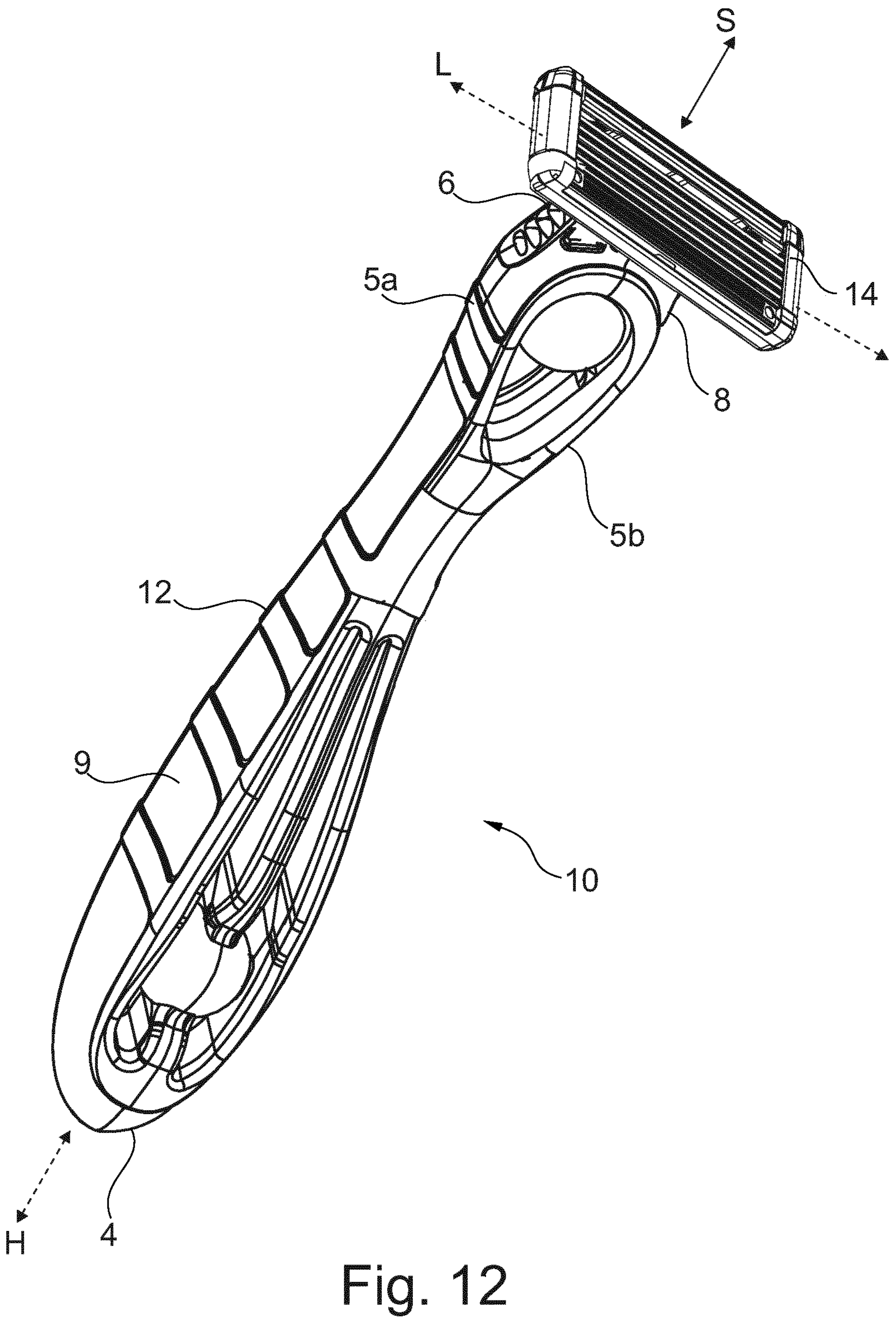
FIG. 12 is a perspective view of another embodiment of a shaving razor assembly.

FIG. 12 is a perspective view of a shaving razor assembly 10 (also denoted a shaver) according to an example having a releasable cartridge mechanism. The shaving razor assembly 10 comprises blades 16*a-d* which are not driven by a motor. The shaving razor assembly 10 comprises a handle 12 extending in a handle direction H between a proximal portion 4 and a distal portion 6 of the handle 12. A razor cartridge 14 is mounted at the distal portion 6 of the handle 12. The razor cartridge 14 will be presented in more detail following discussion of the shaving razor assembly 10.

The mounting of the razor cartridge 14 to the distal portion 6 of the handle 12 in the illustration is via a pivotable bearing member 8 enabling a frame of reference of the handle 12 to vary relative to a frame of reference of the razor cartridge 14, to thus enable the angle of the razor cartridge against the skin of a user to vary and adapt to changes during use.

In particular, the razor cartridge 14 pivots relative to the handle 12 about the longitudinal axis L of the razor cartridge 14, in use. The pivoting enables the user to adapt to contours of the body, for example. The longitudinal axis L of the razor cartridge 14 is substantially perpendicular to the shaving direction along the handle 12. Another example of a connection mechanism for connecting the razor cartridge 14 to the handle 12 is discussed in WO2006/027018 A1. Another alternative is a razor cartridge 14 that may pivot relative to a second pivot axis (a rocking axis), substantially perpendicular to axis L. In embodiments, the pivotable bearing member 8 may be omitted (not illustrated) and the handle 12 provided as an integrally connected part of the support of the razor cartridge 14. In an embodiment, the pivotable bearing member 8 may further comprise, or be replaced by, a release mechanism 5*a*, 5*b*, enabling rapid release of an exhausted razor cartridge from the handle 12.

In an embodiment, the handle 12 and the support of the razor cartridge 14 are integrally formed with a pivotable bearing member (not illustrated) such as a plastic spring member.

The connection of the razor cartridge to the handle 12 is not limited only to the aforementioned embodiment that entails the razor cartridge to be releasably attached to a razor handle 12 via pivotable connection. In embodiments, the razor cartridge is releasably attached to the razor handle 12 via a non-pivotable connection. In embodiments, the razor cartridge is monolithically formed with the razor handle 12, i.e. the razor cartridge is integrally formed with the razor handle via a non-pivotable connection. In embodiments, the razor cartridge is integrally formed with the razor handle via a pivotable connection.

In an embodiment, the handle 12 is provided with a handle grip 9 formed of a rubber, or rubber-like material to improve gripping friction. In an embodiment, the handle 12 is provided with a thumb-rest 7 to enable a more secure grip of the handle 12 by a user.

The phrase "top of the blade support" for the purposes of this specification means a side of a blade support 18 of a razor cartridge that is closest to a shaving surface of a user when the razor cartridge is in use. When a razor cartridge with such top-mounted cutting members is used, aggressive shaving may result in an increased degree of nicks and cuts and an increased sense of irritation, because the shaving surface is exclusively supported by the cutting edges 43*a-d* of the blades on the blade support 18. This provides the skin with a relatively small surface to be supported on during shaving, and causes an increased degree of "bulging" of the shaving surface (skin) between the inter-blade gaps.

It is difficult to gauge a comfortable water temperature used for shaving using conventional razor cartridges.

According to an optional embodiment, a cartridge 14 for a razor is provided. The cartridge comprises a plurality of blade supports 18, wherein at least one blade support further comprises a blade 16 attached to an inner surface 66 of the at least one blade support 18 that faces away from a shaving surface. The at least one blade support 18 comprises a first optical feature 11 disposed on a portion of an outer surface of the at least one blade support that faces towards the shaving surface. The first optical feature 11 is a first thermochromic portion 74 configured to change color based on a temperature of the at least one blade support 18 according to a first temperature response of the first thermochromic portion.

Figure 13:
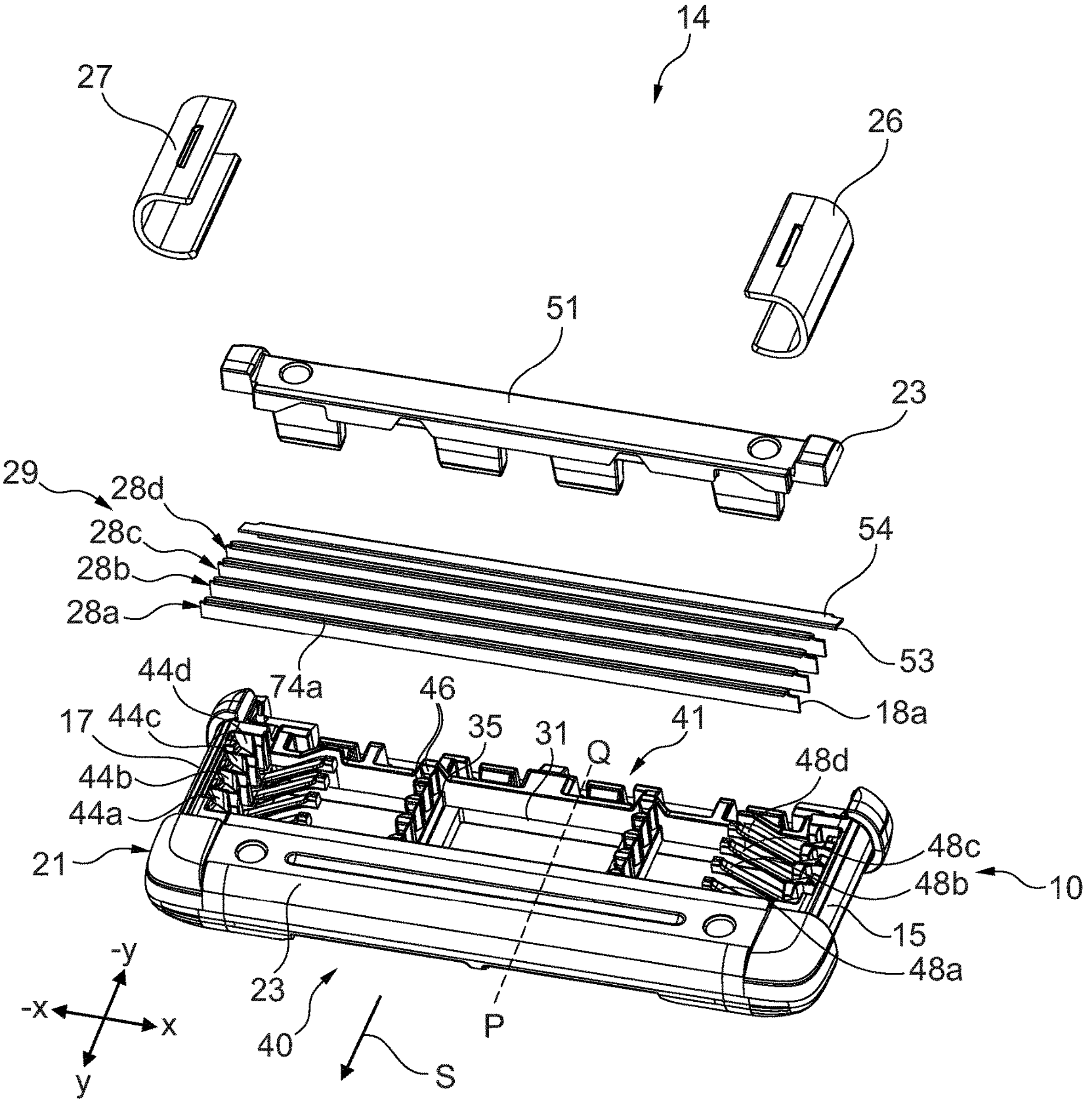
FIG. 13 shows a perspective partial exploded view of a razor cartridge assembly according to an embodiment.

FIG. 13 shows a perspective partial exploded view of a razor cartridge assembly according to the optional embodiment. "Partial exploded view" means that some minor components of the razor cartridge 14 have been omitted from the exploded view to aid clarity of the drawing.

Figure 14:
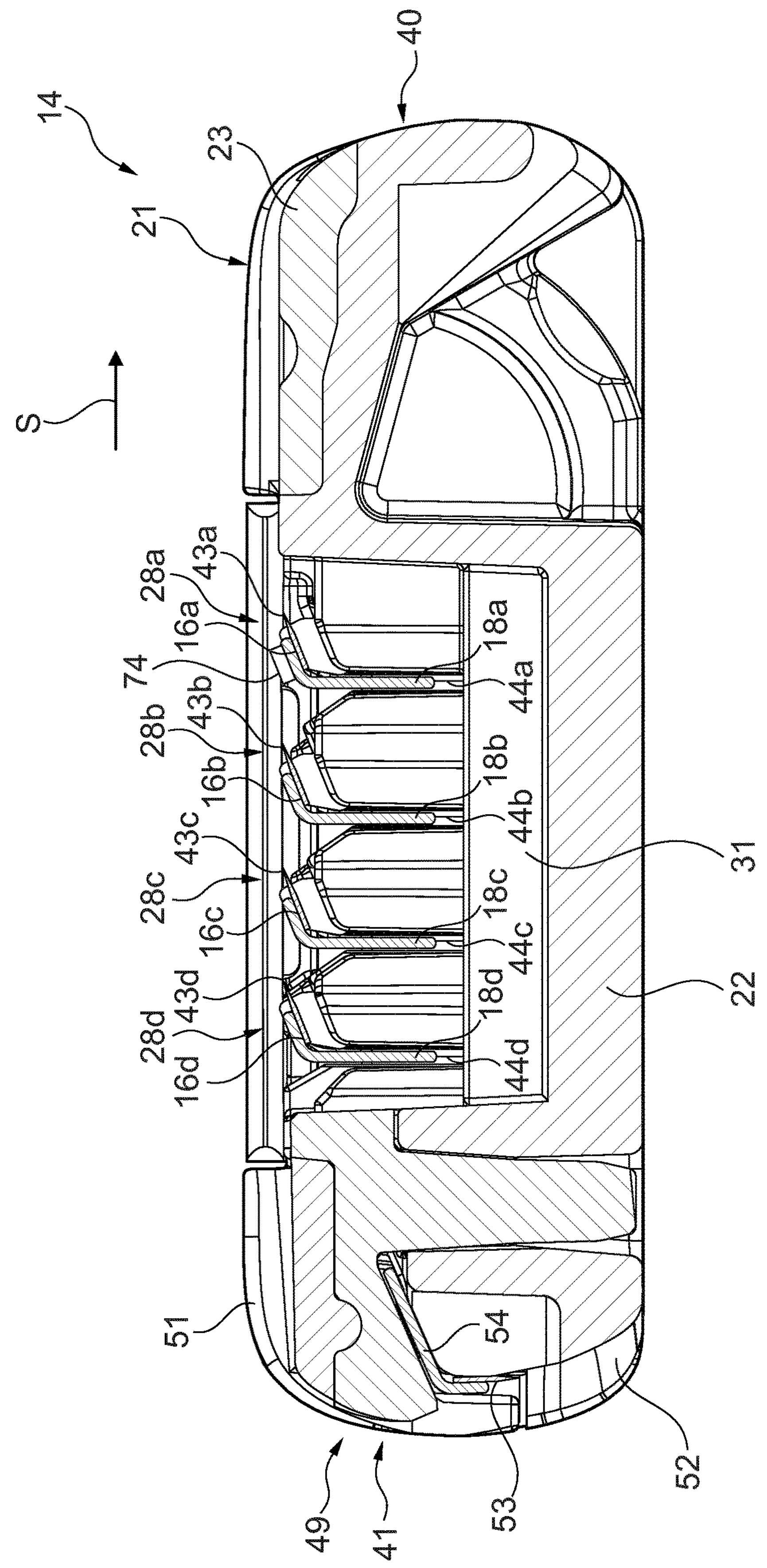
FIG. 14 shows a schematic side view of a portion of a razor cartridge assembly according to an embodiment.

The shaving direction S is depicted in FIGS. 13 and 14 using arrow S. In use, the razor cartridge 14 contacts a shaving surface (not shown in FIG. 2), and is translated across the shaving surface in the direction of arrow S.

A frame 21 may be fabricated partially or completely of synthetic materials, such as plastic, resin, or elastomers. The frame 21 comprises a platform member (not illustrated) connectable to a handle 12 of a shaving razor assembly 10 either integrally, or by a connection mechanism such as a pivotable bearing member 8 or by an interconnecting member (not shown).

A guard member 23 is provided as a substantially longitudinal edge of the razor cartridge 14. In use, the guard member 23 is located at a leading longitudinal side 40 is the first portion of the razor cartridge 14, and is thus the first portion of the razor cartridge 14 to contact uncut hairs. The side of the razor cartridge 14 opposite to the leading longitudinal side 40 of the razor cartridge 14 and opposite to the shaving direction is the trailing longitudinal side 41 of the razor cartridge 14. The trailing longitudinal side 41 is thus the final portion of the razor cartridge 14 to contact the shaving surface, in use.

It will be noted that the terms "leading longitudinal side 40" and "trailing longitudinal side 41" are used to denote specific locations on the razor cartridge 14, and do not imply or require the absence or presence of a particular feature. For example, a guard member 23 may in one embodiment be located at the "leading longitudinal side 40", and in another embodiment a trimming blade may be located at the "trailing longitudinal side 41" in another embodiment, but it is not essential that these locations comprise such features.

The guard member 23, in an embodiment, comprises an elastomeric member (not shown in FIG. 13). In an embodiment, the elastomeric member comprises one or more fins extending longitudinally in parallel to the guard member 23 and substantially perpendicularly to the shaving direction. One purpose of such an elastomeric member is, for example, to tension the skin prior to cutting.

The razor cartridge 14 may, in embodiments, further comprise a cap member (longitudinal trailing assembly 49) at, or near to, the trailing longitudinal side 41. The presence of a cap member (longitudinal trailing assembly 49) is not essential.

The razor cartridge 14 further comprises a group of cutting members 29 accommodated in a blade receiving section 31 of the frame 21. The group of cutting members 29 comprises a plurality of cutting members 28*a-d*. The group of cutting members 29 is disposed in the frame 21 longitudinally and parallel to the shaving direction SH such that in use, blades of the cutting members 28*a-d* contact a shaving surface and cut hair present on the shaving surface as the razor cartridge 14 is moved across the shaving surface in the shaving direction S. The particular design of the group cutting members 29 will be discussed in detail subsequently.

In an embodiment, the cutting member 28 comprises a longitudinal blade support 18 formed from a blank that has been bent to an appropriate angle of attack, and a longitudinal blade 16 that is fixably joined to the longitudinal blade support. The joining method may be, for example, laser spot welding or via adhesive bonding.

In an embodiment, the cutting member 28 is an integrally-formed "bent blade" comprising a longitudinal blade support 18 section, and a longitudinal blade 16 section that are formed from the same piece of material, typically metal. However, a skilled person will appreciate that a "bent blade" has a skin-facing portion that may have an optical feature 11 disposed on it.

In particular, at least one blade support 18*a* comprises a first optical feature 11 as a thermochromic portion 74*a*. The precise disposition of the thermochromic portion 74*a* on the blade support 18*a* will be discussed in detail subsequently. Because the thermochromic portion 74*a* is in direct thermal contact with the metal of the blade support 18*a*, and because the blade support 18*a* is in direct thermal contact with the metal of the blade 16, the arrangement discussed herein provides accurate and rapid visual feedback about the temperature of a blade 16 to a user of the razor cartridge 14.

In an embodiment, a razor cartridge is provided with three cutting members. In an embodiment, a razor cartridge 14 is provided with four cutting members 28. In an embodiment, a razor cartridge 14 is provided with five cutting members 28. In an embodiment, a razor cartridge 14 is provided with six cutting members 28. In an embodiment, a razor cartridge 14 is provided with seven or more cutting members 28. It is not essential that all or a plurality of blade supports 18 of the cutting members 28 are provided with a thermochromic portion 74.

The group of cutting members 29 defines a plurality of substantially parallel inter-blade spans. The number of inter-blade spans is one fewer than the number of cutting members.

The frame 21 further comprises first retainer 26 and second retainer 27 configured to hold the razor blades 16*a-d* within the razor cartridge 14 housing. The frame 21 further comprises first 15 and second 17 side portions. When the razor cartridge 14 is in an assembled state, the first and second side portions 15, 17 are configured to fixedly confine the longitudinal ends of the guard member 23, and the group of cutting members 29. The first side retainer 26 and second retainer 27 may comprise, for example, plastic, an elastomer, or a metal material and furthermore may be of a different shape to that illustrated.

Although not illustrated, a pivotable bearing member 8 may, in an embodiment, be provided on the side of the razor cartridge 14 configured to connect to a pivotable handle 12. Such a pivotable bearing member 8, in an embodiment, comprises two or more shell bearings configured to connect to the pivotable bearing member 8 of the handle 12, although many other designs for a pivotable bearing may be employed.

The cutting members comprised in the group of cutting members 29 are disposed in the razor cartridge such that two cutting edges 43 comprised, respectively, on the two foremost (nearest to the leading side of the razor cartridge) cutting members of the group of cutting members 29 define a leading inter-blade span that is closest to the leading longitudinal side 40 of the razor cartridge 14. The inter-blade spans may be constant, or vary between blades.

The each cutting member in the group of cutting members 29 comprises a longitudinal blade support 18. A longitudinal blade 16 is mounted on the blade support 18. The cutting edge 43 of a cutting member 28*a-d* is oriented forward in the direction of shaving S. The blade support 18 of a cutting member 28*a-d* is an elongated, bent piece of rigid material. In an embodiment, the blade support 18 is a metal such as stainless steel.

Each cutting member in the group of cutting members 29 is, in an embodiment, resiliently mounted in a blade receiving section 31 of the razor cartridge 14. The blade receiving section 31 comprises a longitudinal space in the razor cartridge 14 that is sized to accommodate the group of cutting members 29. At least one cutting member of the group of cutting members 29, up to all cutting members in the group of cutting members 29 may be resiliently mounted in the blade receiving section 31. In the embodiment of FIG. 2, the transverse inner sides of frame 21 comprise a plurality of holding slots 44. Each holding slot 44 on the transverse inner sides is configured to accept and retain one side of a blade support 18 of a cutting member of the group of cutting members 29 so that the cutting members of the group of cutting members 29 are held in the blade receiving section 31 with a substantially parallel inter-blade span. Therefore, as many holding slots 44 are provided in each transverse inner side of frame 21 as there are blade supports 18.

Between the blade receiving section 31 and the handle 12 (in a part adjacent to a handle 12 connection, for example) there are, in embodiments, provided one or more cross members 35 that are integrally formed with the frame 21. The cross members 35 may comprise a plurality of blade support guides 46 provided as a plurality of protuberances aligned with the holding slot 44 on the transverse inner sides of the frame 21. The blade support guides 46 function to regulate the parallel inter-blade span in a longitudinal direction.

In one variant (illustrated in FIGS. 13 and 14), the spacing of the blade supports 18 is progressively decreased between the leading longitudinal side 40 and the trailing longitudinal side 41 of the razor 14 to generate a variable inter-blade span IBS. One alternative way to achieve this arrangement is to progressively decrease the spacing between the holding slots 44 provided on the transverse inner sides in a transverse direction (y to −y) of the razor cartridge 14. The positioning and/or width of the blade support guides 46 is adjusted commensurately such that the group of inter blade spaces IBS between cutting edges 43 of the cutting members 28*a-d* is parallel. Alternatively, the spacing between consecutive blades may be equal in the P-Q direction.

The razor cartridge 14 of FIG. 13 comprises four resilient fingers 48*a-d* under the first retainer 26. The razor cartridge 14 comprises four resilient fingers 48*e-h* under the second retainer 27 that are in transverse corresponding alignment with the four resilient fingers 48*a-d* under the first retainer 26.

In total, the eight resilient fingers 48 each exert a bias force against respective cutting members of the group of cutting members 29 in the direction of the shaving surface such that the cutting members of the group of cutting members 29 are in a rest position, when assembled. In the rest position, the cutting edges 43 of the blades 16, at each lateral end of the blades 16 near the first 26 and second 27 retainers, bear against corresponding stop portions, for example. In an embodiment, the stop portions may be the first 26 and second 27 retainer.

Accordingly, the rest position of the cutting members 28*a-d* is well defined, enabling a high shaving precision. Of course, the illustrated biasing arrangement has many variations. For example, a further plurality of resilient fingers 48 may be provided on one or more of the cross members 35. In a simplified razor cartridge design (such as for low cost, disposable razors), the resilient fingers 48 may be omitted. A skilled person will appreciate that the number of resilient fingers 48 to be provided is related to the number of cutting members 28*a-d* in the group of cutting members 29, and that fewer or more than eight resilient fingers 48 can be provided.

FIG. 14 shows a schematic side view of a portion of the razor cartridge assembly of FIG. 13 along a transverse axis P-Q illustrated by the dotted line in FIG. 13. Where possible, like elements are denoted with like reference numerals.

In addition to the features illustrated in partial exploded view FIG. 13, FIG. 14 further illustrates a longitudinal trailing assembly 49 (cap member) that may, in some embodiments, be included as part of a razor cartridge 14 but is not essential.

In particular, the optional longitudinal trailing assembly 49, in embodiments, comprises an optional longitudinal skin care element 51 (e.g. a lubricating strip) for applying a compound, such as a lubricating compound, to the shaving surface after the cutting edges 43 of the blades 16*a-d* have passed over the shaving surface.

The optional longitudinal trailing assembly 49, in embodiments, comprises a longitudinal trimming blade 53 disposed on the trailing longitudinal side 41 of the razor cartridge 14. The trimming blade 53 may, for example, be used for trimming hairs that are awkward to reach using the blades 16 of the group of cutting members 29, such as extraneous nasal hairs. In an embodiment, the trimming blade 53 only extends across a proportion of the longitudinal direction of the longitudinal trailing assembly 49, such as up to three quarters, up to one half, or up to one quarter.

As illustrated, the trimming blade 53 is mounted on a trimming blade support 54. The assembly of the trimming blade 53 mounted on a trimming blade support 54 is, in an embodiment, identical to the design of the blade receiving section 31, blade support 18, and blade 16 comprised in the group of cutting members 29 to reduce parts variation. Alternatively, the trimming blade 53 and trimming blade support 54 are produced to a different design to the design of the blade receiving section 31, blade support 18, and blade 16 comprised in the group of cutting members 29.

In an embodiment, the optional longitudinal trailing assembly 49 comprises a retractable cover 52 as a safety feature, and to keep the trimming blade 53 sharp when not in use.

In common with the frame 21 of the razor, the optional longitudinal trailing assembly 49 and/or the retractable cover 52 may be provided as a plastic or resin material. In an embodiment the longitudinal trailing assembly 49 is formed integrally with the frame 21. In an embodiment, the longitudinal trailing assembly 49 is glued or ultrasonically welded to the frame 21, for example. In an embodiment, a razor cartridge 14 is provided without a longitudinal trailing assembly 49 such that the trailing edge of the frame 21 in the shaving direction is the trailing longitudinal side 41 of the razor cartridge 14. In an embodiment where the razor cartridge 14 comprises the longitudinal trailing assembly 49, the trailing longitudinal side 41 of the longitudinal trailing assembly 49 in the shaving direction is considered to be the trailing edge of the frame 21 in the shaving direction.

Figure 15:
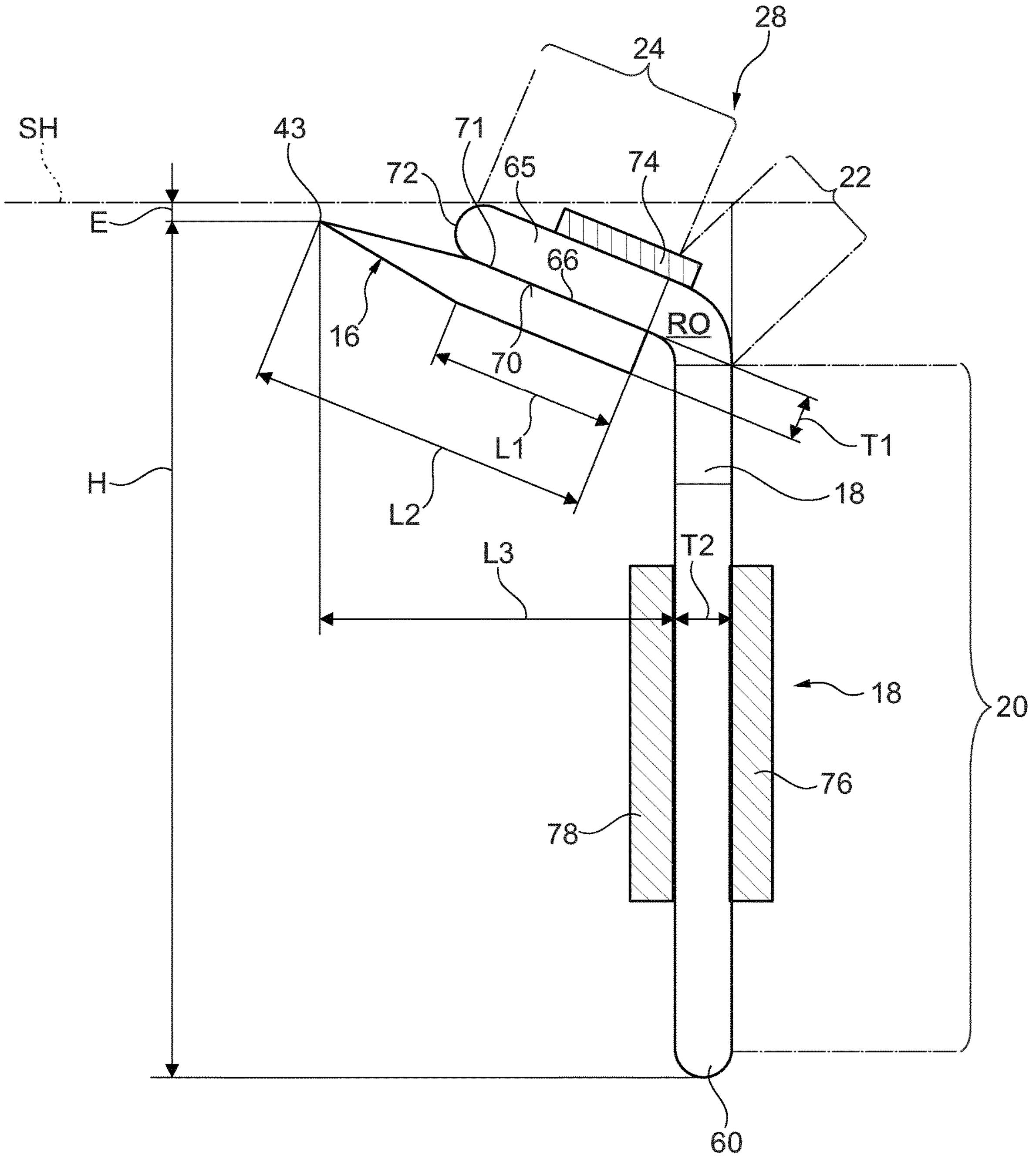
FIG. 15 shows a schematic side view of a cutting member.

FIG. 15 shows an alternative schematic side view of a cutting member 28 comprising a thermochromic portion.

A blade mounting portion 71 is disposed on an inner surface 66 of a respective blade support 18 that, in use, faces away from a shaving surface. The cutting edge 43 extends forward from the front of the blade support 18.

The opposite side of the blade support 18 comprises an outer surface that, in use, faces towards the shaving surface, or skin of the user. Alternatively, this is referred to as a top side of the blade support 18. A first optical feature 11 is provided on the top side of the blade support 18 as a first thermochromic portion 74. As will subsequently be discussed, the first thermochromic portion 74 may be disposed in many different ways on the top side of the blade support 18.

Therefore, in use the first thermochromic portion 74 is visible when a user observes the front of the razor cartridge 14. Alternatively, or in combination, the optical feature 11 may be provided on a second portion 76 of the blade support 18. Alternatively, or in combination, the optical feature may be provided on a third portion 78 of the blade support 18. Alternatively, or in combination, the optical feature may be provided on the surface of the front end 72 and the optical feature can be sufficiently visible by the user, especially when the blade support 18 is thick. When the optical feature is provided as a second thermochromic portion 76 or the third thermochromic portion 78 of the blade support 18, the optical feature is not visible from the front of the razor cartridge 14. However, many razor cartridges have an open frame 21 to enable water to flow more easily during rinsing. The effect of an open frame 21 is that the rear of the blade support 18 is visible when a user holds a razor cartridge 14 with the front of the razor cartridge 14 facing away from them.

Accordingly, an optical feature 11 (thermochromic portion 74) enables feedback about the temperature of blade supports 18 of the razor cartridge 14 from the front of the razor cartridge 14. In an embodiment, as different users may rinse a razor cartridge 14 from either the front or the back, additional thermochromic portions 76 or 78 may be provided on portions of at least one blade support 18 that are visible through the rear of an open frame 21.

The blade support 18 has a non-negligible thickness. For example, the blade support 18 has a thickness in the range 0.12 mm-0.3 mm, specifically in the range 0.12 mm-0.21 mm, and more specifically in the range 0.135 mm-0.185 mm, more specifically in the range 0.155 mm-0.185, specifically in the range 0.145 mm-0.17 mm, specifically in the range 0.155 mm-0.17 mm and most specifically 0.15 mm.

In an embodiment, each blade support 18 of the group of cutting members 29 is identical and has the same thickness T2 and the same tilt angle A. In this case, the cutting edge 43 to blade span are identical.

Although a razor cartridge 14 with four blades 16*a-d* has been illustrated, the present specification also includes a razor cartridge 14 comprising three blades, or greater than four blades.

Accordingly, each of the blade supports 18*a-d* comprises a rounded front end 72 that is configured, in use, to contact the shaving surface in addition to the cutting edges 43 of the blades 16*a-d*, thereby reducing the pressure at each cutting edge contact point with the shaving surface. The pressure at the cutting edge contact points may therefore be reduced.

As discussed, the blade support 18 may be made from a flat sheet metal part which is bent before welding of the blade 16 on the inner surface 66 of the blade support 18. The cutting member 28 thus comprises a blade 16 (razor blade).

The blade 16 has, in its flat portion, a thickness T1 about 0.1 mm (for example, between 0.04 and 0.11 mm, specifically about 0.074 mm). The total length L2 of the blade 16 between the cutting edge 43 of the blade 16 and the opposite back edge of the blade 16 is about 1 mm (for example, between 0.8 mm and 1.3 mm). The portion of the blade 16 that is in contact with the inner surface 66 of a blade support that, in use, faces away from a shaving surface has a length L1 that is about 0.49 mm+/−0.1 mm, specifically between 0.49 mm+/−0.1 mm and 0.77+/−0.1 mm long. In this way, a good retention of the blade on the underside of the blade support 18 (the inner surface of the blade support 18) is ensured.

In an embodiment, the height of the cutting member 28 H is between 1.72 mm and 2.8 mm, specifically between 2.53 mm and 2.63, specifically 2.581.88 mm or 2.58 mm.

In an embodiment, the front end 72 of the blade support 18 is rounded or chamfered to improve glideness properties of the cutting member.

In an embodiment, the blade 16 may be positioned on the inner surface 66 of the blade support 18 to adjust the exposure E of the cutting edge 43 positively or negatively compared to the shaving surface. The exposure is a measure of how prominently the cutting edge 43 of a blade 16 protrudes above or sinks below the end 72 of its blade support 18.

In an embodiment, the blade 16 may be positioned to have an exposure relative to the shaving surface in the range −80 um to +80 um, more specifically an exposure of about −75 um, −65 um, −60 um, −55 um, −50 um, −45 um, −40 um, −35 um, −30 um, −25 um, −20 um, −15 um, −10 um, −5 um, 0 um, 5 um, 10 um, 15 um, 20 um, 25 um, 30 um, 35 um, 40 um, 45 um, 50 um, 55 um, 60 um, 65 um, 70 um, or 75 um.

The length L3 of the cutting member 28, between the cutting edge 43 and the outer face of the lower portion of the blade support 18 is about 1.0 mm, specifically 1.17 mm (for example, between 0.8 mm and 1.6 mm).

The blade 16 is fixed on the inner surface 66 of the blade support by any known means, such as by laser spot welding. Specifically, the blade 16 is fixed on the inner surface 66 of the blade support by a plurality of spot welds (for example, between ten and sixteen spot welds) distributed along the longitudinal dimension of the blade support 18. Each of the spot welds may be performed on the inner face 70 of blade 16. Alternatively, each of the spot welds may be carried out on the outer surface of the blade support 68, or a mixture of the two.

Figure 16A:
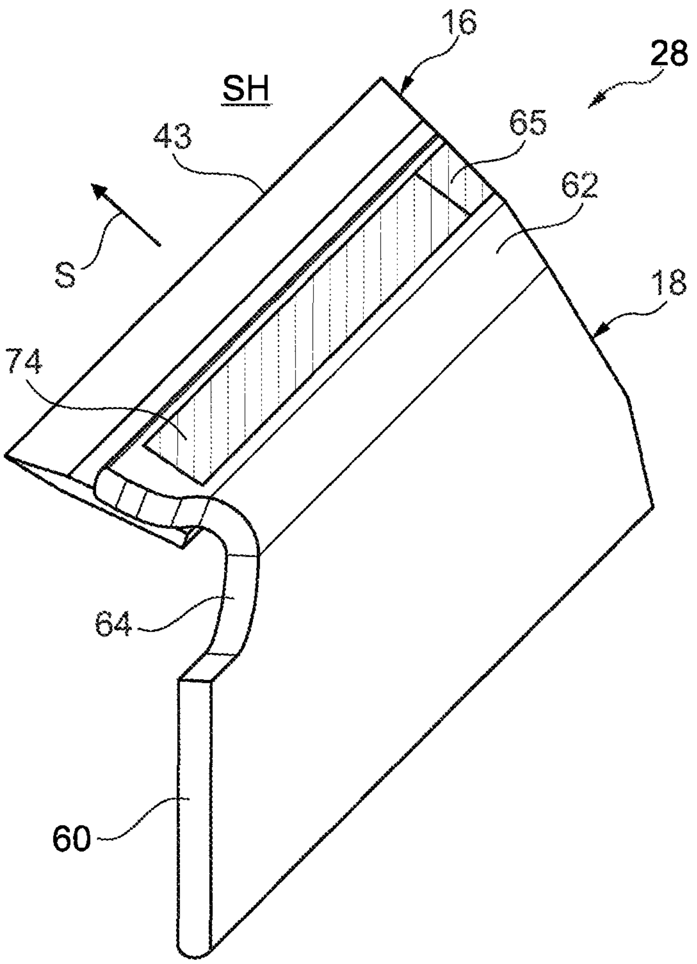
FIGS. 16A and 16B show perspective views of a portion of a cutting member according to embodiments.
Figure 16B:
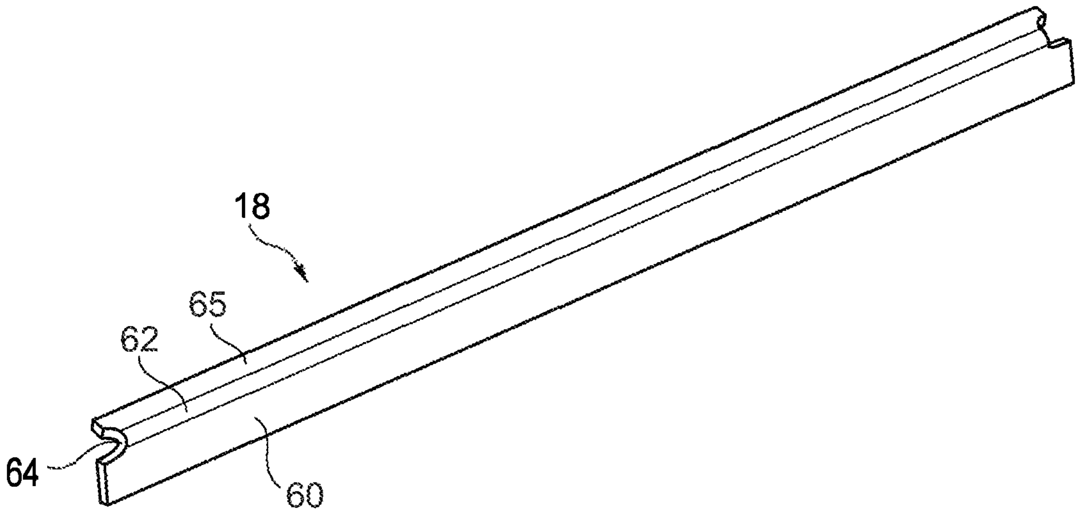

FIG. 16A shows a perspective view of a portion of a cutting member 28 according to an embodiment. Like features discussed in FIG. 15 share the same reference numerals. The top side 65 of blade support 18 provides a mounting portion for the first thermochromic portion 74. As illustrated, the first thermochromic portion 74 is a continuous strip applied to the top side 65 of the blade support 18, or may be divided into sub-portions.

Conventionally, a blade is mounted on the outer surface of a blade support 18, such that in use, no part of the blade support 18 comes into contact with shaving surface.

Notably, in the present aspects and embodiments, a blade mounting portion 71 of the blade support 18 is disposed on an inner surface of the respective blade support 18 that, in use, faces away from a shaving surface, and a blade attached to the blade mounting portion 71 as shown in FIG. 15.

According to the present approach, the blade 16 is mounted on an inner surface of the respective blade support 18 and projects from underneath the inner surface defining a cutting edge to blade span between a cutting edge 43 of the blade and the end of the blade support 18 towards the shaving surface. In use, as the cutting member 28 contacts the shaving surface, both the cutting edge 43 of the blade 16 and the end of the blade support 18 contact the shaving surface simultaneously, leading to a reduction in the force exerted on the shaving surface exerted by a single cutting edge 43, for example.

In other words, the position of a blade 16 on a blade support 18 when a cutting member 28*a-d* is mounted in the razor cartridge 14 is defined by the fact that an imaginary tangent provided from the surface of the blade 16 that is directed away from the shaving surface (such as the skin of a user, in use) does not pass through any point of the blade support 18 that the blade 16 is mounted on.

A further definition of the position of a blade 16 on the blade support 18 is that when a cutting member 28*a-d* is mounted in the razor cartridge 14, an imaginary tangent provided from the portion of the blade 16 in contact with the blade mounting portion 71 that is directed towards the shaving surface in use passes through the blade support 18 that the blade 16 is mounted on.

A further effect is that the provision of a blade 16 hanging "underneath" the blade support 18 as illustrated in particular in FIG. 4, is that the top side 65 of the blade support 18 is available for providing visual feedback to the user. In embodiments, this may be a simple printed logo or block of color. The top side 65 of the blade support 18 (and optionally also the second 76 and third 78 portions of the blade support 18) enable the direct contact of a thermochromic portion with the metallic material of the blade support 18. Thermal energy related to an actual temperature of the blade support 18 may be conducted directly to the thermochromic portion 74 and displayed to a user, to provide the user with more accurate feedback about the temperature of the blade support 18, and hence a blade 16 mounted on the blade support 18 (assuming that conduction losses between the metal comprising the blade 16 and the blade support 18 is minimal). This approach is more accurate than, for example, providing a minimal optical feature 11 to provide optical feedback of the temperature of a razor cartridge in, for example, the frame 21, as provided in the prior art.

In embodiments, the thermochromic portion is in direct contact with the metallic material of blade support 18, and owing to the use of a "hanging blade" arrangement, a portion of the top side 65 of the blade support 18 is wide enough to accommodate a portion or strip of a thermochromic portion 74 that can easily be seen by a user of the razor cartridge 14.

According to a second aspect, there is provided a method for manufacturing a cartridge for a razor.

The method comprises:

obtaining 80 a blade support 18 configured to attach a blade 16 to a razor cartridge;

applying 82 a first optical feature 11 to one or more of a first portion, a second portion, and/or a third portion of the blade support, wherein the first optical feature is selected from one or more of a color, a coating, a texture, a perforation, a transparency of the blade support, a light emitting source, a protrusion and a sticker;

attaching 84 a blade to the blade support; and securing 86 the blade support to a cartridge for a razor.

The order in which the first optical feature 11 is applied to one or more of a first portion, a second portion, and/or a third portion of the blade support are applied to the blade support is not essential and could occur before or after the blade 16 has been attached to the blade support. Furthermore, the first optical feature 11 can be applied to the blade support 18 after the blade support has been secured to the razor cartridge.

Figure 20:
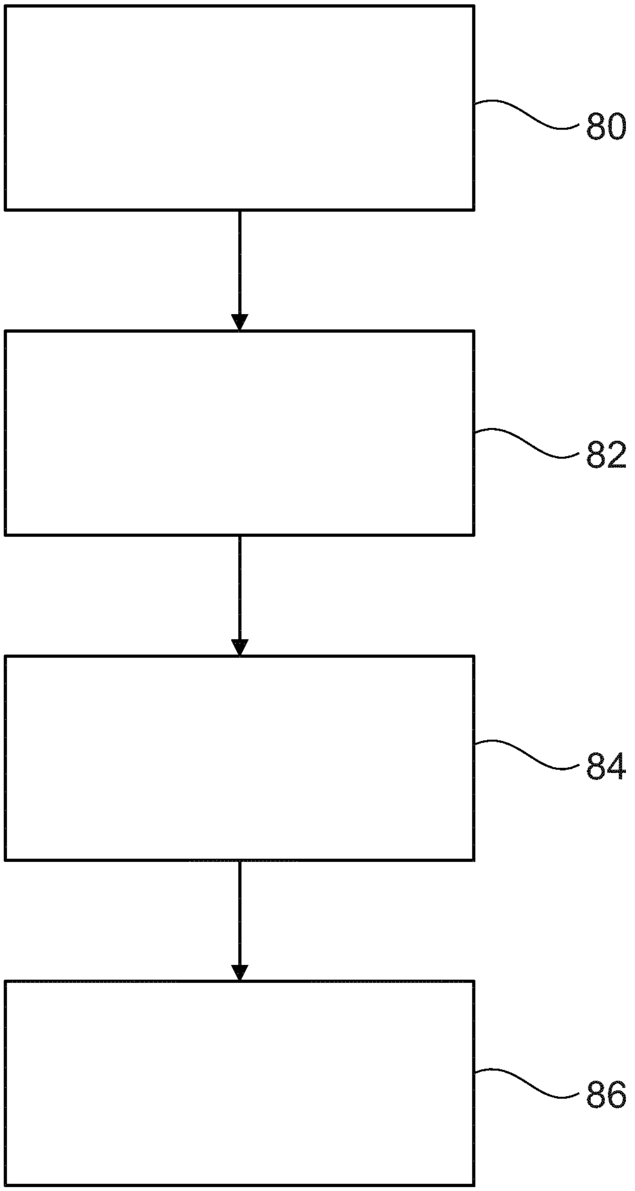
FIG. 20 illustrates a method of manufacturing a razor cartridge according to an embodiment.

FIG. 20 illustrates a method of manufacturing a razor cartridge according to an embodiment.

In embodiments, the blade is attached or secured to the blade support, and the blade support is then secured or attached to the cartridge.

In embodiments, the first optical feature 11 (for example, a thermochromic ink compound, a hydrochromic compound, and/or a color coating) can be applied as a coating on the blade support according to any of the standard methods used to apply paints or coatings such as application by brush, roller, using a conventional air spray or an airless spray. In some embodiments, curing may also be applied as additional step, after the application of the thermochromic ink coating, if the composition of the thermochromic ink needs to be cured to enable solidification.

In embodiments, the deposition of the coating occurs after the attachment of the blade onto the support. In some embodiments, the first optical feature 11 (for example, a thermochromic ink compound, a hydrochromic compound, and/or a color coating) formed as coating may be applied before the attachment of the blade onto the blade support. The first optical feature 11 may be applied, for example, as coating on the blade support when it is in flat-wire form (i.e. when it is a blank). Subsequently, the blank blade support bearing the first optical feature 11 undergoes further production steps including stamping, bending, welding and cropping, prior to attachment of the razor blade 16 by laser spot welding, for example.

Thermochromic Indicators

Returning to the embodiments introduced above, in which an optical feature 11 is provided as one or more portions of blade support 18 coated with a thermochromic dye 34 as illustrated in FIG. 5, chemicals and coating schemes to provide such an optical feature 11 will now be discussed.

A thermochromic portion may be provided on the blade support 18 of a razor cartridge 14 by applying a coating of a thermochromic ink compound to the blade support 18. In a blade support 18 configuration having a blade mounted on a side of a blade support 18 (support member) that faces away from the skin of a razor user (when the cartridge is being used), a large space is available on the surface of the blade support 18 that faces towards the skin of a razor user (when the cartridge 14 is being used). This space (on one or more of the blade supports 18*a-d*) can be used as a mounting portion for optical features 11 in general, because the portion of the blade support 18 (support member) vacated by the removal of the blade 16 from the side of the blade support 18 that faces towards the skin a razor cartridge user (in use) is readily visible to a user. In particular, the vacated space on the portion of the blade support 18 that faces towards the skin of a razor user (when the cartridge 14 is being used) is suitable for the application of a chemical ink coating.

Domestic water systems frequently take up to ten seconds to reach a stable temperature, and may overshoot a desired shaving temperature. Providing a plurality of thermochromic inks responsive to different temperatures may provide an indication to the user that the temperature of the water varies during wet shaving, and may become higher than a temperature at which the user initially began shaving.

The optical feature 11 (optical indicators) formed by the first thermochromic portion are, in embodiments, provided by a thermochromic ink compound incorporated on the blade support 18 of the cutting member 28. An embodiment of a thermochromic ink compound is a mixture of a color-developing organic compound (compound A), a color developer (compound B), and a color change temperature regulator (compound C). The color change temperature regulator acts as a reaction medium for reversible electron exchange between compound A and compound B. In some embodiments, compound C may be a wax.

In other embodiments, the optical feature 11 (optical indicators) formed by the first thermochromic portion can be liquid crystals, such as cholesterol esters, specifically cholesterol oleate/(Z)-octadec-9-enoate, or phenyl ether derivatives of phenyl esters of 4-(2-methylbutyl)phenol.

In the present specification, an embodiment of the color-developing organic compound is a leuco dye (compound A). Alternatively, the leuco dye may be considered to be an electron-donating compound. The color developer (compound B) functions as an electron-accepting compound.

In embodiments, compounds A, B, and C are enclosed in microcapsules. The microcapsules can subsequently be blended with colorants (for example, thermally stable dyes) to formulate the thermochromic ink.

In an embodiment, the thermochromic ink is invisible at a starting temperature, and following a temperature rise displays a color in an irreversible transition. Such functionality may be useful, for example, in the field of one-use disposable razors, to demonstrate that a razor cartridge 14 has been used once (owing to the irreversible nature of the transition).

In an embodiment, the thermochromic ink displays a color at a starting temperature, and following a temperature rise becomes invisible once the temperature has risen past a first threshold. When the temperature drops, the thermochromic ink may again display color when the temperature falls past a second threshold (which, in embodiments, may be the same, or different to, the first threshold).

In an embodiment, the thermochromic ink displays a first color at a starting temperature, and following a temperature rise transitions to display a second color once the temperature has risen past the first threshold. When the temperature drops, thermochromic ink may again display the first color when the temperature falls past a second threshold (which, in embodiments, may be the same, or different to, the first threshold).

In an embodiment, the thermochromic ink is invisible at a starting temperature, and following a temperature rise transitions to display a first color once the temperature has risen past a first threshold. When the temperature drops, the thermochromic ink again becomes invisible when the temperature falls past a second threshold (which, in embodiments, may be the same, or different to, the first threshold).

The function of the thermochromic ink can be explained by compound C. The melting point of compound C defines the temperature at which the thermochromic ink performs a color transition. In some embodiments, the temperature change leads to reversible coloring. In other embodiments, temperature change leads to permanent discoloration of the ink.

Investigations have indicated that recommended temperatures for a pleasant shaving sensation are contained in the range 20 to 45 degrees Celsius, more specifically 32 to 42 degrees Celsius, and most specifically 35 to 39 degrees Celsius.

In an embodiment, the first thermochromic portion is configured to change color when the temperature of a portion of the at least one blade support 18 is in the range 20 to 45 degrees Celsius, more specifically 32 to 42 degrees Celsius, and most specifically 35 to 39 degrees Celsius. In this embodiment, when the temperature of the blade support 18 decreases, the starting color of the thermochromic portion reappears.

In an embodiment, the cartridge 14 comprises a first thermochromic portion configured to perform an irreversible color change above a first temperature response.

In an embodiment, the cartridge 14 is provided wherein the first optical feature 11 is a coating applied to the at least one blade support 18 comprising the thermochromic portion.

A skilled person will appreciate that many different thermochromic dyes or inks may be used dependent upon design requirements. In embodiments, the leuco dye (compound A) may be selected from the group comprising N-acyl leucomethylene blue and derivative compounds thereof, fluoran dye compounds, diarylphthalide compounds, diphenylmethane compounds, spiropyran compounds, and combinations thereof.

More specifically, the compound A may be one, or mixture, of any of the following: 3-(4-diethylamino-2-ethoxyphenyl)-3-(1-ethyl-2-methylindol-3-yl)-4-azaphthalide (Blue 63, CAS number: 69898-40-4), 2'-(dibenzylamino)-6'-(diethylamino)fluoran (CAS number: 34372-72-0), N,N-dimethyl-4-[2-[2-(octyloxy)phenyl]-6-phenyl-4-pyridinyl] benzenamine (Yellow CK37, CAS number: 144190-25-0), 7-(4-diethylamino-2-hexyloxyphenyl)-7-(1-ethyl-2-methyl-1H-indol-3-yl)-7H-furo[3,4-b]pyridin-5-one (Blue 203, CAS number: 98660-18-5), 2-(2,4-dimethylphenylamino)-3-methyl-6-diethylaminofluoran (Black 15, CAS number: 36431-22-8), 3,3-bis-(1-butyl-2-methyl-indol-3-yl)-3H-isobenzofuran-1-one (Red 40, CAS number: 50292-91-6). Other compounds usable as compound A may also be applied.

Compound B (the color developer) may be selected from the group comprising of bisphenols, alkoxy-p-hydroxybenzoates, 3,4,5-trihydroxybenzoic acid and the alkyl esters thereof (also known as gallic acid esters) such as dodecyl gallate, urea, diphenyl urea and related compounds such as Pergafast 201, 1,2,3-triazoles, 4-hydroxycoumarin, and mixtures thereof.

More specifically, the compound B may be any of the following: 2,2-bis(4-hydroxy-3-methylphenyl)propane (bisphenol C, CAS number: 79-97-0), 4-hexyl-1,3-dihydroxybenzene (4-hexylresorcinol, CAS number: 136-77-6), 4,4'-cyclohexylidenebisphenol (BPZ, CAS number: 843-55-0), 4,4'-(hexafluoroisopropylidene)diphenol (bisphenol AF, CAS number: 1478-61-1), 4,4'-(1-phenylethylidene)bisphenol (CAS number: 1571-75-1), 2,2'-dihydroxybiphenyl (CAS number: 1806-29-7), 4,4'-(1,4-phenylenediisopropylidene)bisphenol (CAS number: 2167-51-3), 1,1-bis(4-hydroxy-3-methylphenyl)cyclohexane (CAS number: 2362-14-3), 9,9-bis(4-hydroxyphenyl)fluorene (CAS number: 3236-71-3), 4,4'-(1,3-phenylenediisopropylidene)bisphenol (CAS number: 13595-25-0), 1,1,1-tris(4-hydroxyphenyl) ethane (CAS number: 27955-94-8), 4,4'-(2-ethylhexylidene) diphenol (CAS number: 74462-02-5), α,α,α'-tris(4-hydroxyphenyl)-1-ethyl-4-isopropylbenzene (CAS number: 110726-28-8), and mixtures thereof.

Compound C is selected to change color in temperature ranges listed above. Thus, compound C may be selected from a list of compounds that exhibit melting points between 25-45 degrees Celsius.

Compound C may be selected from the following families of compounds. For example, compound C may be selected from mono- and poly-alcohols family comprising 1-dodecanol, 2-tridecanol, 1-tetradecanol, 1-pentadecanol, 1-hexadecanol, 2-(4-methoxyphenyl)ethanol, 4-isopropylbenzyl alcohol, 1,2-octanediol, 1,9-nonanediol, 2,2-di-n-butyl-1,3-propanediol. For example, compound C may be selected from alkyl and aryl esters family comprising of ethyl palmitate, 2-hydroxythethyl salicylate, dimethyl sebacate, 2-Phenylethyl Phenylacetate, triethyl methane tricarboxylate, dibenzyl carbonate, adipic acid monoethyl ester, dimethyl 1,10-decanedicarboxylate, methyl palmitate, methyl p-toluate, ethyl 2-furoate, ethyl stearate, benzyl cinnamate, methyl 3,4-dimethylbenzoate, dimethyl itaconate, methyl stearate, methyl 3,5-dimethoxybenzoate, phenyl salicylate, ethyl 4-(benzyloxy)benzoate, ethyl 3,4-dimethoxybenzoate, ethyl vanillate, dibenzyl succinate, 1-naphthyl acetate, diethyl terephthalate, cholesteryl oleate, methyl 2-benzyloxybenzoate, methyl eicosanoate, methyl 2-hydroxy-4-methoxybenzoate, 4-Pentylphenyl 4-methoxybenzoate, octadecyl 3,3-diphenylpropanoate, stearyl benzoate. For example, compound C may be selected from alkyl and aryl ketones family comprising of 4'-methoxypropiophenone, 2-tridecanone, 7-pentadecanone, 5-hexadecanone, 7-hexadecanone, 2-pentadecanone, 4-heptadecanone, 3,4-dimethylbenzophenone, dodecanophenone. For example, compound C may be selected from linear and branched alkanes family comprising N-heptadecane, N-octadecane, N-nonadecane, N-eicosane, N-heneicosane, N-docosane. For example, compound C may be selected from alkyl and aromatic carboxylic acids family comprising undecanoic acid, 8-phenyloctanoic acid, erucic acid, decanoic acid, dodecanoic acid.

Specifically, the compound C may be selected from the group comprising ethyl palmitate, dimethyl sebacate, methyl palmitate, methyl p-toluate, ethyl stearate, methyl 3,4-dimethylbenzoate, dimethyl itaconate, methyl stearate, methyl eicosanoate, 2-tridecanol, 1-dodecanol, 4-isopropylbenzyl alcohol, 2-(4-methoxyphenyl)ethanol, 1,2-octanediol, 1-tetradecanol, 2,2-di-n-butyl-1,3-propanediol, 1-pentadecanol, undecanoic acid, erucic acid, decanoic acid, dodecanoic acid, N-octadecane, N-nonadecane, N-eicosane, N-heneicosane, N-docosane, 2-tridecanone, 7-pentadecanone, 5-hexadecanone, 7-hexadecanone, 2-pentadecanone, 4-heptadecanone, 3,4-dimethylbenzophenone, octadecyl 3,3-diphenylpropanoate, 2-Phenylethyl phenylacetate. More specifically, the compound C is selected from the group comprising methyl palmitate, 1,2-octanediol, decanoic acid, n-octadecane, 7-pentadecanone, dimethyl sebacate, 1-dodecanol, 4-isopropylbenzyl alcohol, n-octadecane, ethyl stearate, octadecyl 3,3-diphenylpropanoate, stearyl benzoate, dodecanophenone.

For example, compound C may be selected from the group of methyl palmitate, 1,2-octanediol, decanoic acid, n-octadecane, 7-pentadecanone that change color between 28 to 34 degrees Celsius.

For example, compound C may be selected from the group of dimethyl sebacate, 1-dodecanol, 4-isopropylbenzyl alcohol, n-octadecane that change color between 25-30 degrees Celsius; or specifically between 25-28 degrees Celsius.

For example, compound C may be ethyl stearate that changes color at 34 degrees Celsius.

For example, compound C may be methyl palmitate that changes color between 31-35 degrees Celsius.

For example, compound C may be octadecyl 3,3-diphenylpropanoate that changes color at 32 degrees Celsius.

For example, compound C may be methyl stearate that changes color at 40 degrees Celsius.

For example, compound C may be stearyl benzoate that changes color between 42-46 degrees Celsius.

For example, compound C may be dodecanophenone that changes color between 44-46 degrees Celsius.

More specifically, compound C may be selected from the group of n-eicosane, 5-hexadecanone, 7-hexadecanone, 2,4-dimethylbenzyl alcohol, 1-tetradecanol, methyl 3,4-dimethylbenzoate, dimethyl itaconate, that change color between 36-38 degrees Celsius.

A skilled person will appreciate that the examples above are not limiting, and that other forms of thermochromic ink may be used to provide the visual temperature feedback of the first optical feature 11 on the blade support 18 discussed herein.

In some embodiments, the razor cartridge 14 may comprise a plurality of thermochromic inks. A first thermochromic ink comprises a first reaction medium as compound C. A second thermochromic ink comprises a second reaction medium as compound C that is different from the reaction medium included in the first thermochromic ink. For example, the second thermochromic ink contains reaction medium having a higher or a lower melting point than the reaction medium in the first thermochromic ink.

In some embodiments, the first reaction medium may be selected from the group comprising ethyl palmitate, dimethyl sebacate, methyl palmitate, methyl p-toluate, ethyl stearate, methyl 3,4-dimethylbenzoate, dimethyl itaconate, methyl stearate, methyl eicosanoate, 2-tridecanol, 1-dodecanol, 4-isopropylbenzyl alcohol, 2-(4-methoxyphenyl) ethanol, 1,2-octanediol, 1-tetradecanol, 2,2-di-n-butyl-1,3-propanediol, 1-pentadecanol, undecanoic acid, erucic acid, decanoic acid, dodecanoic acid, N-octadecane, N-nonadecane, N-eicosane, N-heneicosane, N-docosane, 2-tridecanone, 7-pentadecanone, 5-hexadecanone, 7-hexadecanone, 2-pentadecanone, 4-heptadecanone, 3,4-dimethylbenzophenone, octadecyl 3,3-diphenylpropanoate, 2-Phenylethyl phenylacetate. Specifically, the first reaction medium may be selected from the group comprising methyl palmitate, 1,2-octanediol, decanoic acid, n-octadecane, 7-pentadecanone, dimethyl sebacate, 1-dodecanol, 4-isopropylbenzyl alcohol, n-octadecane, ethyl stearate, octadecyl 3,3-diphenylpropanoate, stearyl benzoate, dodecanophenone.

In some embodiments, the thermochromic portion may comprise a mixture of different thermochromic inks having a plurality of temperature responses.

In some embodiments, reaction medium as compound C that melts at temperature ranges higher than the optimum shaving temperature includes 1,2-octanediol, ethyl stearate which changes color at temperatures above 34 degrees Celsius.

Indicative embodiments of reaction medium as compound C that melts at temperatures lower than the optimum shaving temperature include dimethyl sebacate, 1-dodecanol, 4-isopropylbenzyl alcohol, n-octadecane (color change between 25 to 30 degrees Celsius) and dimethyl sebacate, 1-dodecanol, 4-isopropylbenzyl alcohol, n-octadecane (color change between 25 to 28 degrees Celsius).

In an embodiment, the first thermochromic ink compound changes color between 30 to 34 degrees Celsius, enabling a user to visually perceive a different color than the initial color of the blade support 18. As the temperature of the water increases, or might still be cold, the user can view a second signal that the temperature is too high or low. This second visual signal is given by a different color change compared to the first color change, achieved by using a different thermochromic ink comprising a reaction medium as compound C that melts at a higher or a lower temperature than the range 30 to 34 degrees Celsius, in combination with a different colorant.

In an embodiment, the color change occurs within several seconds, specifically within 0.01 second to 10 seconds, more specifically within 0.1 second to 5 seconds, upon exposure of an aqueous solution at the optimum shaving temperature.

For example, the first thermochromic portion 74 on the blade support 18 in the razor cartridge 14 can show a color change within 2 seconds, or within 1 second, or within 0.5 seconds upon exposure at the optimum shaving temperature or above.

In an embodiment, the first optical feature 11 is a first thermochromic portion configured to change color based on temperature of the at least one blade support 18. Therefore, the first thermochromic portion 74 extends along the entire top side 65 of one blade support 18 of the razor cartridge 14. In an embodiment, the first thermochromic portion 74 may be provided as a portion extending halfway, one third, or one quarter along the top side 65 of one blade support 18.

FIG. 5 discussed above illustrates an alternative where thermochromic dye 34 may change color when the water is within a satisfactory temperature range for shaving, as shown by the varying colors of thermochromic dye 34 on blade support 18, e.g., a red color 34*a* indicating water is sufficiently warm and a blue 34*b* color indicating the water is not sufficiently warm for shaving.

Figure 17:
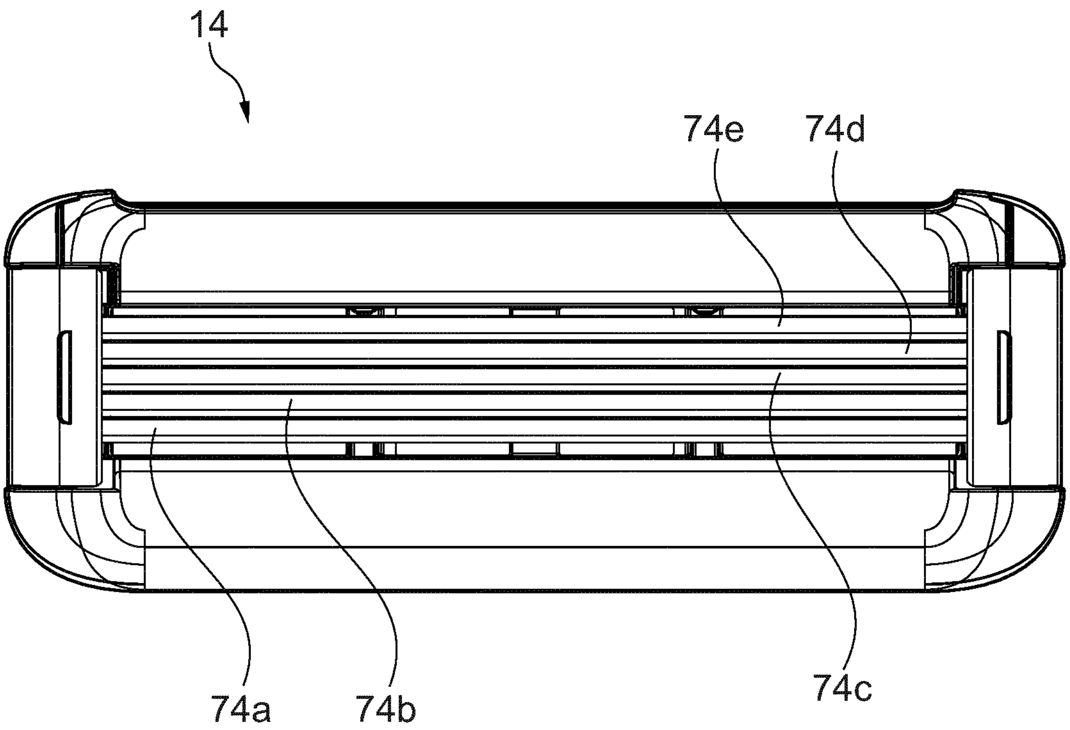
FIG. 17 shows a schematic front view of a razor cartridge showing an exemplary layout of thermochromic portions on cutting members according to an embodiment.

FIG. 17 shows a schematic front view of a razor cartridge 14 showing an exemplary layout of thermochromic portions 74*a*-74*e* on cutting members 28*a-d* according to an embodiment. The razor cartridge 14 shown in FIG. 17 comprises five blades. However, the skilled person will appreciate that the present technique is optionally applicable to razor cartridges having one, two, three, four, five, or more blades and the corresponding blade supports fa-d.

The thermochromic portions 74*a-e* are provided on the top sides 65 of the blade supports 18*a-d* in the razor cartridge 14 illustrated in FIG. 6. The extra space on the top sides 65 of the blade supports provided by the respective blades being attached to respective inner surfaces of the blade supports provides vacant space at the front view of the razor cartridge 14 to enable a legible set of thermochromic portions 74*a-e* to be displayed to a user.

FIGS. 18A-18D show schematic views of alternative layout approaches for thermochromic portions on cutting members according to an embodiment.

Figure 18A:
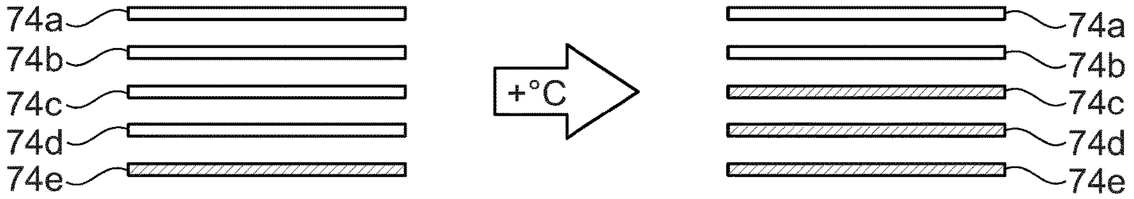
FIGS. 18A-18D show schematic views of alternative layout approaches for thermochromic portions on cutting members according to an embodiment.

FIG. 18A shows a schematic view of a plurality of thermochromic portions 74*a*-74*e* each applied to the top side 65 of respective blade supports (not shown). In this case, the thermochromic portions 74*a*-74*e* each have escalating transition temperatures. The left-hand side of FIG. 18A shows the arrangement of thermochromic portions 74*a*-74*e* at a low shaving temperature. The right-hand side of FIG. 18A shows the thermochromic portions at an acceptable shaving temperature. The coloring of the arrangement of thermochromic portions 74*a*-74*e* therefore behaves in the manner of a bar graph in a transverse direction of the razor cartridge 14. In an embodiment, each thermochromic portion 74*a*-74*e* displays the same color. In an embodiment, each thermochromic portion 74*a*-74*e* displays a progressively changing color (for example, from blue to red to indicate a change from cold to hot).

Figure 18B:
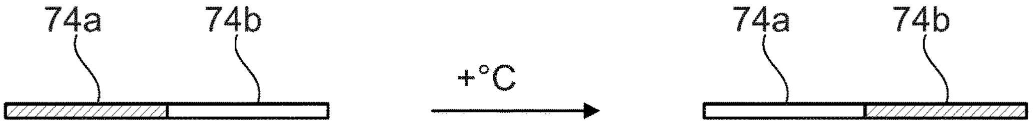

FIG. 18B shows a schematic view of a top side 65 of a single blade support 18 comprising a first thermochromic portion 74*a* and a second thermochromic portion 74*b*. As the temperature increases, the pigmentation of the first and second thermochromic portions "toggles" from left to right, to indicate that the razor is at the correct temperature.

Figure 18C:
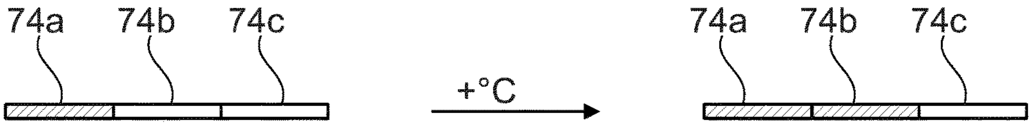

FIG. 18C shows a longitudinal version of the arrangement of FIG. 18A, in which three thermochromic portions 74*a*-74*c* function as a longitudinal bar graph as the temperature increases. Of course, this assumes uniform heating of the blade support 18. Of course, if non-uniform heating of the blade support 18 occurs (for example, when holding the razor too still when rinsing under a hot tap), such a longitudinal arrangement of a plurality of thermochromic portions can assist a user in equalising the temperature of the entire set of blades along the entire longitudinal dimension.

According to an embodiment, the first thermochromic portion extends longitudinally along the at least one blade support 18, and wherein the first thermochromic portion is divided longitudinally into at least a first and a second sub-portion, wherein the first sub-portion is configured to display a different color from the second sub-portion based on the temperature of the at least one blade support 18. A sub portion may be considered to be one of the thermochromic portions 74*a*, 74*b*, and/or 74*c* as illustrated in FIG. 18C. In other words, a sub-portion of a thermochromic portion is a segment divided from the thermochromic portion.

Figure 18D:
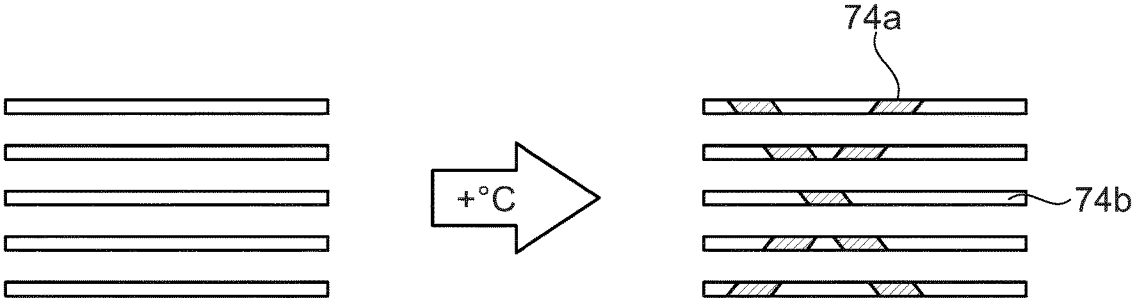

FIG. 18D illustrates a first thermochromic portion 74*a* that is distributed across five sets of top sides 65 of blade supports 18 in the form of a cross logo (the thermochromic portions can be provided in the form of any logo or graphic). Therefore, a warning sign can be displayed when the razor cartridge 14 reaches an unsafe temperature. Alternatively, a manufacturer logo made it may be displayed when the razor cartridge 14 reaches a safe temperature.

Many other variations and arrangements of thermochromic portions 74 upon blade supports 18 of razor cartridge 14 may be considered by a skilled person, and the foregoing discussion is intended to illustrate embodiments.

In an embodiment, the first optical feature 11 includes a first layer and a second layer disposed on the first layer, wherein the first layer includes a first color, the second layer includes a second color, and the second layer is configured to be gradually removed during use of the razor. Therefore, the second layer is a material or compound that can be gradually eroded in use. For example, the second layer may be a material such as a wax that gradually melts and is removed in a stream of warm rinsing water, to thus reveal the color of the first layer. Alternatively or in combination, the second layer may be gradually removed through the action of friction when shaving.

Figure 19:
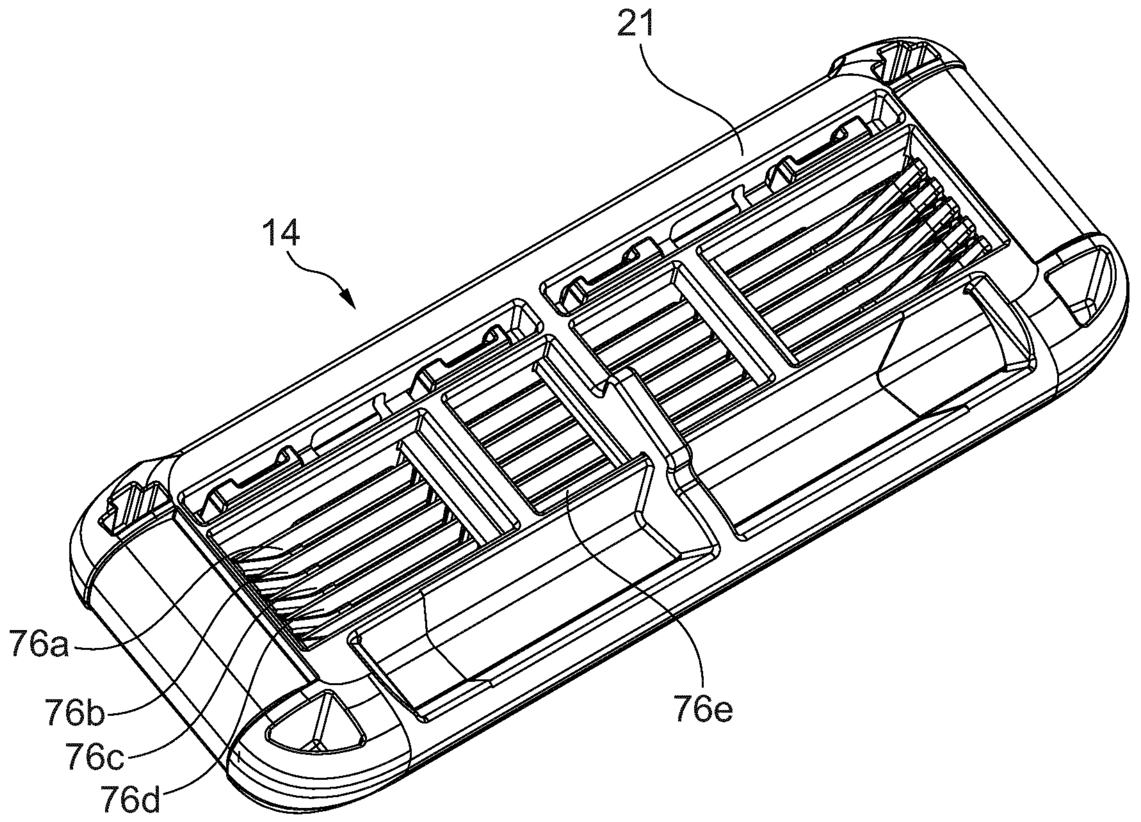
FIG. 19 shows a perspective rear view of a razor cartridge showing an exemplary layout of thermochromic portions on the rear of cutting members according to an embodiment.

FIG. 19 shows a perspective rear view of a razor cartridge 14 showing an exemplary layout of thermochromic portions on the rear of cutting members according to an embodiment. As discussed in the section above concerning FIG. 15, it is not essential that the thermochromic portion is distributed entirely on the top side 65 of the blade support 18. For example, a second thermochromic portion 76 and/or a third thermochromic portion 78 may be provided on one or more sides of the blade support 18.

As seen in the perspective view of FIG. 19, a razor cartridge 14 with an "open architecture" frame 21 has good visibility to the rear of the blade supports 18. Accordingly, providing second and/or third thermochromic portions on the sides of the blade support 18 can improve the amount of information available to a user of a razor cartridge 14.

According to an embodiment, the first thermochromic portion is configured to display a color gradient along a longitudinal direction of the at least one blade support 18, and the color gradient changes in a longitudinal direction based on the temperature of the at least one blade support 18.

Accordingly, the mixture of dyes and reaction mediums in the ink applied to the thermochromic portion changes longitudinally as the ink is applied to, for example, the top surface 65 of the blade support 18. The effect is that, when the blade support 18 is held at a constant temperature, a color gradient that changes between and first and a second color that changes in the longitudinal direction of the blade support 18 is displayed. As the temperature of the blade support 18 increases, the color gradient may travel along the blade support 18 in a longitudinal direction.

According to an embodiment, the first optical feature 11 is not provided on the blade.

According to an embodiment, the first optical feature 11 is provided on a first blade support 18*a* of the plurality of blade supports 18*a-d*, and the second optical feature is provided on a second blade support 18 of the plurality of blade supports 18*a-d*.

According to an embodiment, the first and second optical features are provided on the same blade support 18 of the plurality of blade supports 18*a-d*.

According to an embodiment, the same blade support 18 comprises an erodible overlapping portion between the first and second optical features.

Hydrochromic Indicators

Optionally or in addition, the optical feature 11 comprises a hydrochromic portion (hydrochromic feature).

Hydrochromic features may be used as aesthetic features or may be used as a pattern indicator that can provide a visible pattern indicating status of the component bearing the hydrochromic feature. A hydrochromic feature is one that changes color when exposed to water, or water vapour. For example, after a given number of uses of a razor cartridge (such as between 1 and 20, more specifically between 2 and 10 uses) the presence of the pattern may indicate that replacement of the razor cartridge is necessary. Alternatively, a hydrochromic feature may be used to display that damage to a razor cartridge has occurred, indicating a need for replacement.

In embodiments, a hydrochromic material may additionally, or alternatively, be applied to an inner surface of the at least one blade support that in use faces away from a shaving surface, wherein the at least one blade support 18 comprises a first optical feature 11 disposed on a portion of an outer surface of the at least one blade support 18 that in use faces towards the shaving surface. Razor cartridges having an "open architecture" enable the inner surface of at least one blade support to be visible through the frame member of a cartridge from the opposite side of the razor cartridge to the side that contacts a user during shaving. Therefore, optionally, the rear side of the blade supports may be used as an additional surface to provide a optical feature providing a thermochromic and/or hydrochromic indication to a user.

In embodiments, the hydrochromic material may be applied to a portion of an outer surface of the at least one blade support 18 that in use faces towards the shaving surface as a coating.

Alternatively or in combination, a hydrochromic material may be applied as one or multiple layers on the portion of an outer surface of a blade support 18.

In an embodiment, a first exposed surface of the outer surface of the blade support 18 may comprise a thermochromic coating functioning as a thermochromic indicator. A second surface provided in-between the first exposed surface, and the surface of the blade support 18 may be a hydrochromic material. In this case, if the thermochromic coating is abraded or damaged, the hydrochromic will change color and indicate this condition.

In an embodiment, the hydrochromic coating may be applied directly to an outer surface of a blade support 18 without a covering layer to indicate the degree of water exposure of the surface of the blade support 18.

In an embodiment, a plurality of hydrochromic materials are used to provide a plurality of respective distinctive layers that fluoresce at different colors when in contact with water.

An embodiment of a hydrochromic material is polydiacetylene.

Laser Marking

In an embodiment, the first optical feature 11 is provided as a laser-marked portion. For example, a marking on one or more blade supports 18 may be desirable for providing markings/signs that are useful and easily visible to the user.

In an embodiment, the first optical feature 11 is provided as a laser-marking on a portion of an outer surface of a blade support 18 that in use faces towards the shaving surface.

In an embodiment, the outer surfaces of all blade supports 18 of a razor is marked with a similar pattern.

In an embodiment, the outer surfaces of each blade support 18 of a razor are marked with successive composite strips of a logo or image, such that an entire logo may be displayed to a user using the skin-facing portion of the razor cartridge 14.

In an embodiment, the laser-marking is applied to a blade support blank as a pattern projection, so that after bending of the blade support blank to form a blade support 18, the pattern will assume the intended shape of the laser-marking.

In an embodiment, the laser-marking is applied to a previously bent blade support blank (i.e. a complete blade support).

In an embodiment, the outer surface of a blade support 18 that in use faces towards the shaving surface is provided with icons or text conveying a specific message.

In an embodiment, the outer surface of a blade support 18 that in use faces towards the shaving surface is first provided with an optical feature comprising a laser-marking, and then coated with a water-soluble coating. Therefore, initially a razor cartridge 14 will appear to the user to be normal, but after a given number of uses of the razor cartridge 14, the water-soluble coating is depleted, and removed, to reveal the laser-marked layer of the optical feature, which may comprise a message encouraging the user to replace the razor cartridge 14. Accordingly, the water-soluble coating should match the durability of the blades.

Advantageously, laser engraving yields increased versatility as a process and can achieve relatively high processing speeds. A laser engraving process can enable portions of a blade support 18 to be provided with an arbitrary and quickly changeable message or logo, or to enable different types of razor to be distinguished from one another.

A method of manufacturing incorporating a step of laser engraving can perform laser engraving before or after the blade support 18 has been formed into an angled portion. An immobilisation system to immobilise a portion of a continuous strip of metal placed before the blade manufacturing unit is provided. A laser engraving unit comprising a mirror galvanometer is provided before the blade manufacturing unit. The purpose of the immobilisation system is to immobilise the continuous metal strip so that the laser engraving unit can create a shape or message on the continuous metal strip.

As is evident from the figures and text presented above, as well as the examples below, a variety of embodiments are contemplated. These embodiments are detailed in the following statements supported by the detailed description:

A1. A cartridge for a razor, the cartridge comprises:

at least one blade; and a blade support configured to attach the at least one blade to the cartridge, wherein the blade support includes a first portion, a second portion, and a third portion, an optical feature provided on one or more of the first portion, the second portion, and the third portion, and wherein the optical feature is selected from one or more of a color, a coating, a texture, a perforation, a transparency of the blade support, a light emitting source, and a sticker.

A2. The cartridge of embodiment A1, wherein the at least one blade is secured to a surface that is opposite to a skin-facing surface of third portion of the blade support.

A3. The cartridge of embodiment A2, wherein the at least one blade is provided in a housing of the cartridge, partially exposed through an opening of the housing such that the optical feature is also partially exposed through the opening.

A4. The cartridge according to any of embodiments A1 to A3, wherein the optical feature is not provided on the blade.

A5. The cartridge according to any of embodiments A1 to A4, wherein the optical feature is provided on at least part of the first portion, the second portion, and the third portion.

A6. The cartridge according to any of embodiments A1 to A5, wherein the blade is connected to the third portion of the blade support, and the optical feature includes the light emitting source provided inside the blade support, the light being emitted through a transparent portion of at least the third portion of the blade support.

A7. The cartridge according to any of embodiments A1 to A6, wherein the first portion and the third portion are substantially straight, and the second portion is bent at an angle and connects the first portion to the third portion.

A8. The cartridge according to any of embodiments A1 to A7, wherein the optical feature includes a first layer and a second layer disposed on the first layer, wherein the first layer includes a first color, the second layer includes a second color, and the second layer is configured to be gradually removed during use of the razor.

A9. The cartridge according to any of embodiments A1 to A8, wherein the blade support includes a skin-facing surface and a surface opposite the skin-facing surface, wherein the at least one blade is secured to the surface opposite the skin-facing surface.

A10. A method of manufacturing the cartridge of any of embodiments A1 to A9 wherein the cartridge includes a plurality of blade supports having a plurality of respective blades supported thereon, the method comprising:

providing an optical feature on at least one blade support of the cartridge, wherein the optical feature includes a first layer and a second layer, wherein the first layer includes a first color, the second layer includes a second color, and the second layer is configured to be gradually removed during use of the razor.

A11. The method according to the embodiment A10, wherein the optical feature further includes a light-emitting feature.

The following statements define an alternative aspect also supported by the detailed description above:

B1. A cartridge for a razor, the cartridge comprising:

a plurality of blade supports, wherein at least one blade support further comprises a blade attached to an inner surface of the at least one blade support that in use faces away from a shaving surface, wherein the at least one blade support comprises a first optical feature disposed on a portion of an outer surface of the at least one blade support that in use faces towards the shaving surface; and wherein the first optical feature is a first thermochromic portion configured to change color based on a temperature of the at least one blade support according to a first temperature response of the first thermochromic portion.

B2. The cartridge according to statement B1, wherein the plurality of blade supports comprises a second blade support, wherein the second blade support comprises a second optical feature disposed on a portion of an outer surface of the second blade support that, in use, faces towards the shaving surface, wherein the second optical feature is a second thermochromic portion configured to change color based on the temperature of the second blade support according to a second temperature response of the second thermochromic portion.

B3. The cartridge according to one of statements B1 or B2, wherein the at least one blade support further comprises a further optical feature disposed on a different portion of an outer surface of the at least one blade support that in use faces towards the shaving surface than the portion of the at least one blade support comprising the first thermochromic portion, wherein the further optical feature is a further thermochromic portion configured to change color based on the temperature of the at least one blade support according to a further temperature response of the further thermochromic portion.

B4. The cartridge according to one of the preceding statements, wherein the first temperature response of the first thermochromic portion is different to the second temperature response of the second thermochromic portion and/or different to the further temperature response of the further thermochromic portion.

B5. The cartridge according to one of the preceding claims, wherein the first thermochromic portion is configured to display a first color when the at least one blade support has a first temperature and to display a second color when the at least one blade support has a second temperature.

B6. The cartridge according to one of statements B1 to B5, wherein the first thermochromic portion is configured to change color when the temperature of a portion of the at least one blade support is in the range 20-45 degrees Celsius, more specifically 32-42 degrees Celsius, and most specifically 35-39 degrees Celsius.

B7. The cartridge according to one of statements B1 to B6, wherein the first thermochromic portion extends longitudinally along the at least one blade support, and wherein the first thermochromic portion is divided longitudinally into at least a first and a second sub-portion, wherein the first sub-portion is configured to display a different color from the second sub-portion based on the temperature of the at least one blade support.

B8. The cartridge according to one of the preceding statements, wherein the first thermochromic portion comprises a thermochromic ink compound comprising one or more of: a leuco dye, a developer, and a first reaction medium.

B9. The cartridge according to one of statements B2 to B8, wherein the second thermochromic portion comprises a thermochromic ink compound comprising one or more of: a leuco dye, a developer, and a second reaction medium, and wherein the second reaction medium has a melting point that is higher or lower than the melting point of the first reaction medium.

B10. The cartridge according to one of statements B8 or B9, wherein the first reaction medium is selected from the group comprising -methyl palmitate, 1,2-octanediol, decanoic acid, n-octadecane, 7-pentadecanone, dimethyl sebacate, 1-dodecanol, 4-isopropylbenzyl alcohol, n-octadecane, ethyl stearate, octadecyl 3,3-diphenylpropanoate, stearyl benzoate, dodecanophenone.

B11. The cartridge according to one of the preceding statements, wherein the first optical feature includes a first layer and a second layer disposed on the first layer, wherein the first layer includes a first color, the second layer includes a second color, and the second layer is configured to be gradually removed during use of the cartridge.

B12. The cartridge according to one of the preceding statements, wherein the at least one blade support includes a first portion, a second portion, and a third portion, wherein the third portion is visible through a rear of the frame of the cartridge, and the first optical feature is provided on one or more of the first portion, the second portion, or the third portion.

B13. A method of manufacturing a cartridge for a razor comprising:

obtaining a plurality of blade supports, wherein at least one blade support further comprises a blade attached to an inner surface of the blade support that faces away from the shaving surface, wherein the at least one blade support comprises a first optical feature disposed on a portion of an outer surface of the at least one blade support that faces towards a shaving surface, and providing the first optical feature on the at least one blade support comprising a first thermochromic portion configured to change color based on the temperature of the at least one blade support according to a first temperature response of the first thermochromic portion.

B14. A shaving razor assembly comprising:

a razor handle;

a razor cartridge according to one of statements B1 to B12, wherein the razor cartridge is either releasably attached to the razor handle via a pivotable or non-pivotable connection, integrally formed with the razor handle via a non-pivotable connection, or integrally formed with the razor handle via a pivotable connection.

B15. A kit of parts comprising:

a razor cartridge holder comprising a plurality of razor cartridges according to one of statements B1 to B12, and optionally a razor handle.

The many features and advantages of the present disclosure are apparent from the detailed specification, and thus, it is intended by the appended claims to cover all such features and advantages of the present disclosure that fall within the true spirit and scope of the disclosure. Further, since numerous modifications and variations will readily occur to those skilled in the art, it is not desired to limit the present disclosure to the exact construction and operation illustrated and described, and accordingly, all suitable modifications and equivalents may be resorted to, falling within the scope of the present disclosure.

Moreover, those skilled in the art will appreciate that the conception upon which this disclosure is based may readily be used as a basis for designing other structures, methods, and systems for carrying out the several purposes of the present disclosure. Accordingly, the claims are not to be considered as limited by the foregoing description.

Technical and scientific terms used herein have the same meaning as commonly understood to one of ordinary skill in the art to which this disclosure belongs unless clearly indicated otherwise. As used herein the singular forms “a”, “an”, and “the” include plural references unless the context clearly dictates otherwise. Thus, for example, reference to “a sensor” may include a plurality of such sensors and reference to “the sensor” may include reference to one or more sensors and equivalents thereof known to those skilled in the art, and so forth.

The above description is illustrative and is not intended to be restrictive. One of ordinary skill in the art may make numerous modifications and/or changes without departing from the general scope of the disclosure. For example, and as has been described, the above-described embodiments (and/or aspects thereof) may be used in combination with each other.

Additionally, portions of the above-described embodiments may be removed without departing from the scope of the disclosure. In addition, modifications may be made to adapt a particular situation or material to the teachings of the various embodiments without departing from their scope. Many other embodiments will also be apparent to those of skill in the art upon reviewing the above description.

REFERENCE NUMERALS

S Shaving direction
SH Shaving plane
L Longitudinal direction
IBS inter blade span
RO inner radius of curvature
T1 Razor blade thickness
T2 Blade support thickness
θ Angle
4 proximal portion
5*a*, 5*b* release mechanism
6 distal portion
8 pivotable bearing member
9 handle grips
10 shaver
11 optical feature
12 handle
14 cartridge (razor cartridge)
15 first side portion
16*a-d* blade
17 second side portion
18*a-d* blade support (support member)
19 blade protector
20 first portion of blade support 18
21 frame
22 second portion of blade support 18
23 guard member
24 third portion of blade support 18
24*a* skin-facing surface
24*b* surface opposite skin-facing surface
26 first retainer
27 second retainer
28*a-d* cutting member
29 group of cutting members
30 first layer of colored paint
32 second layer of colored paint
31*a-d* blade receiving section
32 second layer of colored paint
34 thermochromic dye
34*a* first color
34*b* second color
35 cross member
36 translucent portion
38 textured surface
40 leading longitudinal side
41 trailing longitudinal side
42 rubber or gel-like coating
43*a-d* cutting edge
44*a-d* holding slots
46 blade support guide
48*a-d* resilient finger
49 longitudinal trailing assembly
50 packaging
50*a* transparent window
51 longitudinal skin care element
52 retractable cover
53 trimming blade
54 trimming blade support
60 lower portion of blade support
62 radius bend
64 rounded indent
65 top side of blade support member
66 inner surface of blade support
68 outer surface of blade support
70 inner face of blade
71 blade mounting portion
72 rounded front end of blade support
74 first thermochromic portion
76 second thermochromic portion
78 third thermochromic portion
80 obtaining a blade support . . . .
82 applying a first optical feature . . . .
84 attaching a blade . . . .
86 securing the blade support . . . .

The invention claimed is:

1. A cartridge for a razor, the cartridge comprising:
at least one blade; and
at least one first blade support configured to attach the at least one blade to the cartridge,
wherein the first blade support includes a first portion, a second portion, and a third portion, a first optical feature provided on one or more of the first portion, the second portion, and the third portion,
wherein the at least one blade is secured to a surface of the third portion that is opposite to a skin-facing surface of the third portion of the first blade support,
wherein the at least one blade is provided in a housing of the cartridge, partially exposed through an opening of the housing such that the first optical feature is also partially exposed through the opening, and
wherein the first optical feature comprises a laser-marked portion.

2. The cartridge according to claim 1,
wherein the first optical feature is not provided on the blade.

3. The cartridge according to claim 1,
wherein the at least one blade is connected to the third portion of the first blade support, and the first optical feature includes a light emitting source provided inside the blade support, the light being emitted through a transparent portion of at least the third portion of the blade support.

4. The cartridge according to claim 1,
wherein the first portion and the third portion are substantially straight, and the second portion is bent at an angle and connects the first portion to the third portion.

5. The cartridge according to claim 1,
wherein the first optical feature includes a first layer and a second layer disposed on the first layer, wherein the first layer includes a first color, the second layer includes a second color, and the second layer is configured to be gradually removed during use of the cartridge.

6. The cartridge according to claim 1,
wherein the first optical feature is a coating comprising a thermochromic ink compound.

7. The cartridge according to claim 6,
wherein the first optical feature is a thermochromic portion configured to change color based on a temperature of the first blade support according to a first temperature response of the thermochromic ink compound.

8. The cartridge according to claim 6,
wherein the first optical feature extends longitudinally along the first blade support, and wherein the first optical feature is divided longitudinally into at least a first sub-portion and a second sub-portion, wherein the first sub-portion is configured to display a different color from the second sub-portion based on the temperature of the first blade support.

9. The cartridge according to claim 6,
wherein the thermochromic ink compound comprises one or more of: a leuco dye, a developer, and a first reaction medium.

10. The cartridge according to claim 1,
wherein the first optical feature at least partially comprises a coating of polydiacetylene.

11. The cartridge according to claim 1, wherein the at least one first blade support comprises
a plurality of blade supports, wherein a second blade support of the plurality of blade supports further comprises a second blade attached to an inner surface of the second blade support that in use faces away from a shaving surface, wherein the second blade support comprises a second optical feature disposed on a portion of an outer surface of the second blade support that in use faces towards the shaving surface.

12. The cartridge according to claim 11;
wherein the second optical feature comprises a thermochromic portion configured to change color based on a temperature of the second blade support.

13. The cartridge according to claim 12,
wherein the second blade support further comprises a third optical feature disposed on a different portion of the outer surface of the second blade support that in use faces towards the shaving surface than the portion of the second blade support comprising the first thermochromic portion; and
wherein the third optical feature is a first thermochromic portion configured to change color based on the temperature of the second blade support according to a temperature response of the second thermochromic portion.

14. The cartridge according to claim 11,
wherein the second optical feature comprises a laser-marked portion.

15. The cartridge according to claim 11, wherein the second optical feature includes a first layer and a second layer disposed on the first layer, wherein the first layer includes a first color, the second layer includes a second color, and the second layer is configured to be gradually removed during use of the cartridge.

16. A shaving razor assembly comprising:
a razor handle; and
a razor cartridge according to claim 1, wherein the razor cartridge is either releasably attached to the razor handle via a pivotable or non-pivotable connection, integrally formed with the razor handle via a non-pivotable connection, or integrally formed with the razor handle via a pivotable connection.

17. The cartridge according to claim 1, wherein the first optical feature comprises a water-soluble coating provided on top of the laser-marked portion.

18. The cartridge according to claim 1, wherein the first optical feature comprises an abradable coating provided on top of the laser-marked portion.

19. A method for manufacturing a cartridge for a razor, the method comprising:
obtaining a blade support configured to attach a blade to a razor cartridge;
applying a first optical feature to one or more of a first portion, a second portion, and a third portion of the blade support, wherein the first optical feature comprises a laser-marked portion;
attaching a blade to a surface of the third portion that is opposite to a skin-facing surface of the third portion of the blade support;
securing the blade support to a cartridge for a razor; and
providing the blade in a housing of the cartridge, partially exposed through an opening of the housing such that the first optical feature is also partially exposed through the opening.

20. A cartridge for a razor, the cartridge comprising:
at least one blade; and
a first blade support configured to attach the at least one blade to the cartridge,
wherein the first blade support includes a first portion, a second portion, and a third portion, a first optical feature provided on one or more of the first portion, the second portion, and the third portion, and
wherein the at least one blade is secured to a surface of the third portion that is opposite to a skin-facing surface of the third portion of the first blade support, and
wherein the first optical feature is provided on the skin-facing surface and includes a laser-marked portion.

* * * * *